(12) United States Patent
Hine et al.

(10) Patent No.: US 7,641,524 B2
(45) Date of Patent: Jan. 5, 2010

(54) WAVE POWER VEHICLE TETHERS

(75) Inventors: Roger G. Hine, Menlo Park, CA (US);
Derek L. Hine, Portola Valley, CA (US);
Joseph D. Rizzi, Los Altos, CA (US);
Kurt A. F. Kiesow, San Jose, CA (US);
Robert Burcham, Anchorage, AK (US);
William A. Stutz, San Jose, CA (US)

(73) Assignee: Liquid Robotics Inc., San Jose, CA (US)

( * ) Notice: Subject to any disclaimer, the term of this patent is extended or adjusted under 35 U.S.C. 154(b) by 0 days.

(21) Appl. No.: 12/082,513

(22) Filed: Apr. 11, 2008

(65) Prior Publication Data

US 2008/0299843 A1    Dec. 4, 2008

Related U.S. Application Data

(63) Continuation of application No. 11/436,447, filed on May 18, 2006, now Pat. No. 7,371,136.

(60) Provisional application No. 60/760,893, filed on Jan. 20, 2006.

(51) Int. Cl.
*B63H 19/02* (2006.01)

(52) U.S. Cl. .......................................... 440/9; 114/293

(58) Field of Classification Search ................. 114/293; 440/9, 13, 17, 18, 19, 20; 439/391
See application file for complete search history.

(56) References Cited

U.S. PATENT DOCUMENTS

| | | | |
|---|---|---|---|
| 986,627 A | 3/1911 | Fischer | |
| 1,315,267 A | 9/1919 | White | |
| 2,520,804 A | 8/1950 | Hollar | |
| 3,132,322 A | 5/1964 | Maes | |
| 3,297,814 A * | 1/1967 | McClean et al. | 174/41 |
| 3,312,186 A | 4/1967 | Litsheim | 115/4 |
| 3,453,981 A | 7/1969 | Gause | 440/9 |
| 3,508,516 A | 4/1970 | Root | 115/4 |
| 3,760,441 A | 9/1973 | Handleman | |
| 3,845,733 A | 11/1974 | Jackman | 115/28 |
| 3,872,819 A | 3/1975 | Pickens | 440/9 |
| 3,928,967 A | 12/1975 | Salter | 60/398 |
| 3,978,813 A | 9/1976 | Pickens et al. | |
| 4,224,707 A | 9/1980 | Mariani | |
| 4,332,571 A | 6/1982 | Jakobsen | 440/9 |
| 4,371,347 A | 2/1983 | Jakobsen | 440/9 |
| 4,383,725 A * | 5/1983 | Bogese et al. | 439/391 |
| 4,389,843 A | 6/1983 | Lamberti | 60/507 |

(Continued)

FOREIGN PATENT DOCUMENTS

WO    WO 87/04401    7/1987

(Continued)

OTHER PUBLICATIONS

Article by Luc Rainville entitled Wirewalker: An Autonomous Wavepowered Vertical Profiler, Aug. 19, 2001.

(Continued)

*Primary Examiner*—Lars A Olson
(74) *Attorney, Agent, or Firm*—T. H. P. Richardson

(57) ABSTRACT

A wave-powered water vehicle includes a surface float, a submerged swimmer, and a tether which connects the float and the swimmer, so that the swimmer moves up and down as a result of wave motion. The swimmer includes one or more fins which interact with the water as the swimmer moves up and down, and generate forces which propel the vehicle forward. The vehicle, which need not be manned, can carry communication and control equipment so that it can follow a course directed by signals sent to it, and so that it can record or transmit data from sensors on the vehicle.

13 Claims, 14 Drawing Sheets

U.S. PATENT DOCUMENTS

| | | | | |
|---|---|---|---|---|
| 4,598,547 | A | 7/1986 | Danihel | 60/507 |
| 4,673,363 | A | 6/1987 | Hudson et al. | |
| 4,684,350 | A | 8/1987 | DeLima | 440/9 |
| 4,684,359 | A | 8/1987 | Herrington | 440/9 |
| 4,763,126 | A | 8/1988 | Jawetz | |
| 4,842,560 | A | 6/1989 | Lee | 440/9 |
| 4,896,620 | A | 1/1990 | Jones | |
| 4,968,273 | A | 11/1990 | Monot | 440/14 |
| 4,981,453 | A | 1/1991 | Krishan et al. | |
| 5,084,630 | A | 1/1992 | Azimi | 290/53 |
| 5,577,942 | A | 11/1996 | Juselis | 441/21 |
| 5,902,163 | A | 5/1999 | Barruzzi et al. | |
| 6,099,368 | A | 8/2000 | Gorshkov | 440/9 |
| 6,561,856 | B1 | 5/2003 | Gorshkov | 440/9 |
| 6,980,228 | B1 | 12/2005 | Harper | |
| 7,371,136 | B2 | 5/2008 | Hine et al. | |
| 2003/0220027 | A1 | 11/2003 | Gorshkov | 440/9 |
| 2004/0102107 | A1 | 5/2004 | Gorshkov | 440/9 |

FOREIGN PATENT DOCUMENTS

WO     WO 94/10029     11/1994

OTHER PUBLICATIONS

International Search Report and Written Opinion for PCT/US 2008/002743.

* cited by examiner

WAVE POWER VEHICLE TETHERS

CROSS-REFERENCE TO RELATED APPLICATIONS

This application is a continuation of application Ser. No. 11/436,447, filed May 18, 2006 now U.S. Pat. No. 7,371,136, which claims priority from provisional patent application No. 60/760,893, filed Jan. 20, 2006. This application is related to another continuation of application Ser. No. 11/436,447 which is being filed contemporaneously with this application (Ser. No. 12/082,457).

BACKGROUND OF THE INVENTION

This invention relates to the utilization of the power of waves in water (hereinafter "wave power").

As a wave travels along the surface of water, it produces vertical motion, but no net horizontal motion, of water. The amplitude of the vertical motion decreases logarithmically with depth; at a depth of about half the wave length, there is little vertical motion. The speed of currents induced by wind also decreases sharply with depth. A number of proposals have been made to utilize wave motion to do useful work. Reference may be made, for example, to U.S. Pat. Nos. 986,627, 1,315,267, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630 and 6,561,856. The entire disclosure of each of those patents is incorporated herein by reference for all purposes.

SUMMARY OF INVENTION

In accordance with the present invention, we have discovered a wide variety of ways in which wave power can be utilized, including novel water vehicles, novel components which are useful for wave-powered water vehicles and for other purposes, and novel methods using wave-powered water vehicles. In preferred embodiments, the invention makes it possible for an unmanned water vehicle to carry out tasks which would be tedious, expensive or dangerous to carry out using a vehicle operated by human beings.

In a first preferred aspect, this invention provides a wave-powered device which comprises
(1) afloat,
(2) a swimmer, and
(3) a tether connecting the float and the swimmer;

the float, swimmer and tether being such that, when the vehicle is in still water,
  (i) the float is on or near the surface of the water,
  (ii) the swimmer is submerged below the float, and
  (iii) the tether is under tension;

the swimmer comprising
  (2a) a swimmer body having a longitudinal axis, and
  (2b) a fin system which
    (a) is secured to the body,
    (b) comprises a fin, and
    (c) when the device is in water having waves moving across the surface of the water (hereinafter wave-bearing water),
       (i) has a configuration which changes as a result of the wave motion, and
       (ii) interacts with the water to generate forces which tend to move the swimmer in a direction having a horizontal component (hereinafter referred to simply as "in a horizontal direction").

The term "fin" is used herein to denote a component comprising a generally laminar surface against which, when the device moves relative to water in which the device is positioned, the water exerts pressure sufficient to substantially influence the movement of the device. The "longitudinal axis" of the swimmer body lies in the generally vertical plane along which the swimmer moves when the device is in wave-bearing water. Usually, but not necessarily, the dimension of the swimmer body measured along the longitudinal axis will be substantially greater than the dimension of the swimmer body measured transverse to the longitudinal axis.

The device preferably has at least one of (i.e. one or more of) the following characteristics (A) the fin system comprises a fin, for example a generally laminar fin, which rotates about an axis of rotation (e.g. an axis of rotation generally transverse to the longitudinal axis of the swimmer body), the axis of rotation having a spatial relationship to the swimmer body which changes when the device is in wave-bearing water;

(B) the fin system comprises (i) a fin, for example a generally laminar fin, which rotates about an axis of rotation (e.g. an axis of rotation generally transverse to the longitudinal axis of the swimmer body), and (ii) an elastic component (e.g. a metal coil spring, a metal leaf spring, a metal torsion bar, or an elastomeric component such as a natural or artificial rubber band) which is not part of the fin, and which deforms elastically and thus influences changes in the configuration of the fin system when the device is in wave-bearing water;

(C) the fin system comprises a fin, for example a generally laminar and elastically deformable fin, having a leading edge which comprises (i) a relatively rigid central section which has a fixed spatial relationship with the swimmer body (including the possibility that the central section rotates about an axis of rotation having a fixed spatial relationship with the swimmer body), and (ii) relatively deformable outboard sections;

(D) the fin system comprises two generally laminar fins, for example two generally laminar and elastically deformable fins which are mirror images of each other, and each of which rotates about an axis of rotation generally aligned with the longitudinal axis of the swimmer body (such fins operate in a manner similar to the pectoral fins on a fish or the wings on a bird, and are referred to herein as "pectoral" fins);

(E) the tether comprises an elastically deformable member;

(F) the tether comprises a component which transmits data and/or electrical power;

(G) the swimmer body has a substantially rigid fore section, a midsection which is relatively flexible in the vertical plane, and a substantially rigid aft section, the tether being attached, for example, to the fore section, and the fin system being attached, for example, to the fore section;

(H) the swimmer body comprises one or more components selected from electrical equipment, communications equipment, recording equipment, control electronics, steering equipment, and sensors;

(I) the swimmer comprises a fin which influences the orientation of the swimmer body in the horizontal plane when the device is in the wave-bearing water, e.g. one or more fins which are substantially vertical when the device is in still water, for example one or more such fins secured to, or being an integral part of, the swimmer body; for example, a part of the swimmer body could have a relatively small horizontal dimension and a relatively large vertical dimension; for example, such a part, if it formed the trailing end of the swimmer body could be actuated to steer the swimmer;

(J) the device is a water vehicle which moves in a horizontal direction when the device is in wave-bearing water;

(K) the swimmer body comprises a central tubular housing and wave-actuated propulsion fins extend either side of the body tube;

(L) the swimmer body comprises a generally tubular housing and vertical fin surfaces at or near both the leading end and the trailing end of the swimmer body; one or both of such vertical fin surfaces can optionally be actuated to steer the vehicle; preferably the trailing fin can be actuated to steer the swimmer, and the leading fin is fixed; the two fins help to balance the drag forces and to limit rotation of the swimmer when it is pulled sideways by the tether.

When reference is made herein to a fin or other component which rotates about an axis of rotation, or to a component which is rotatably mounted or secured, this includes not only the possibility that the rotation is about a single axis, but also the possibility that the rotation results from rotation about two or more adjacent axes (which may be, but need not be, parallel to each other), and the possibility that the rotation involves a continuous relative motion of adjacent parts of the fin or other component, as for example when one part of a flexible fin is fixed and the rest of the flexible fin moves relative to (i.e. "rotates about") the fixed part.

Other novel characteristics which are optionally present are described below.

A device having characteristics (A) and (B) can for example include (i) a generally laminar fin which is mounted, optionally rotatably mounted, directly or indirectly on a rigid bar which is mounted, optionally rotationally mounted, on the swimmer body, and (ii) a spring and/or a torsion bar which is directly or indirectly connected to the fin and/or to the rigid bar and which influences (a) the speed and/or the extent of the rotation of the fin and/or the rigid bar, and/or (b) the spatial relationship between the swimmer body and the axis of rotation, during part or all of the changes in configuration of the system.

A device having characteristic (C) can for example have a fin system which comprises a generally laminar and elastically deformable fin (such a fin optionally being the sole elastic component, or one of a plurality of elastic components, of the fin system), the fin having a leading edge which comprises (i) a relatively rigid central section which rotates about an axis of rotation generally transverse to the longitudinal axis of the swimmer body, and (ii) relatively deformable outboard sections (for example a fin having a swept back, e.g. generally V-shaped, leading edge), In a second preferred aspect, this invention provides a wave-powered water vehicle which comprises (1) a float,
(2) a swimmer,
(3) a tether connecting the float and the swimmer, and
(4) a computer system;

the float, swimmer and tether being such that, when the vehicle is in still water, (i) the float is on or near the surface of the water,
(ii) the swimmer is submerged below the float, and
(iii) the tether is under tension;

the swimmer, when the vehicle is in wave-bearing water, interacting with the water to generate forces which move the vehicle in a horizontal direction;

the float comprising a satellite-referenced position sensor;

the swimmer comprising (a) a sensor which senses direction in a horizontal plane, and (b) a steering actuator; and the computer system (a) being linked to the position sensor, the horizontal sensor and the rudder, and (b) containing, or being programmable to contain, instructions to control the steering actuator in response to signals received from the position sensor and the horizontal sensor, or in response to signals received from a sensor on the vehicle. In the water vehicles of the second aspect of the invention, the swimmer preferably comprises a body and a fin system according to the first aspect of the invention, but can comprise a different means for generating forces which move the vehicle in a horizontal direction.

The invention will be chiefly described by reference to water vehicles in which at least part of the useful power generated by the movement of the swimmer is used to move the vehicle in a horizontal direction (the remainder of that power, if any, being converted into other useful forms, or wasted). However, the invention includes the possibility that none of the power generated by the movement of the swimmer is so used, i.e. all that power is converted into other useful forms or is wasted, as for example when the float or the swimmer is held in a fixed location, e.g. by an anchor or other attachment.

If the float is also moved by other forces (for example by wind, water currents or a conventional propulsion system) the movement of the swimmer modifies (for example accelerates or decelerates and/or changes the direction of) the movement of the float.

The water vehicles of the invention often comprise a single float and a single swimmer, and the invention will be chiefly described with reference to such water vehicles. However, the invention includes the possibility that there is more than one float, and/or more than one swimmer, for example a single float attached to a plurality of swimmers, the swimmers preferably being axially aligned, by a plurality of tethers.

For any particular water vehicle of the invention, the influence of the swimmer on the movement of the float will depend on the size and frequency of waves. The movement of the float will also depend for example on environmental conditions such as water currents and wind, and any other propulsion or steering system operating on the float. In suitable conditions, the swimmer will move the vehicle forward at a speed which is satisfactory for many purposes, without any other propulsion system (though it may be desirable to use another power source to operate a steering system). In preferred embodiments, the vehicle is equipped with control and steering systems which enable it to be remotely controlled in a desired way, for example so as to move in a closed pattern around a desired fixed location, and/or to follow a desired path between two locations, which may be many miles apart, and/or to traverse slowly back and forth over an area of the ocean in order to gather a wide variety of data.

In a third preferred aspect, this invention provides a method of utilizing wave power which comprises placing a device according to the first or second preferred aspect of the invention in a body of water which has or which is expected to have water waves traveling across its surface.

In a fourth preferred aspect, this invention provides a method of obtaining information which comprises receiving signals from a device according to the first or second preferred aspect of the invention.

In a fifth preferred aspect, this invention provides a method of obtaining information which comprises examining signals recorded by a device according to the first or second preferred aspect of the invention.

In a sixth preferred aspect, this invention provides a method for controlling a function of a device according to the first or second preferred aspect of the invention, the method comprising sending signals to the device.

In a seventh preferred aspect, this invention provides novel floats suitable for use in the first or second preferred aspect of the invention and for other purposes; novel swimmers suitable for use in the first or second preferred aspect of the invention and for other purposes; novel fin systems suitable for use in the first or second preferred aspect of the invention and for other purposes; and novel fins suitable for use in the first and second preferred aspects of the invention and for other purposes.

In an eighth preferred aspect, this invention provides kits of parts comprising two or more of the components needed to assemble a device according to the first or second preferred aspect of the invention.

Other novel features are disclosed in the Detailed Description below and the attached Drawings, and form part of the present invention.

BRIEF DESCRIPTION OF THE DRAWINGS

The invention is illustrated by the accompanying drawings, which are diagrammatic and not to scale, and in which.

Figure 1:
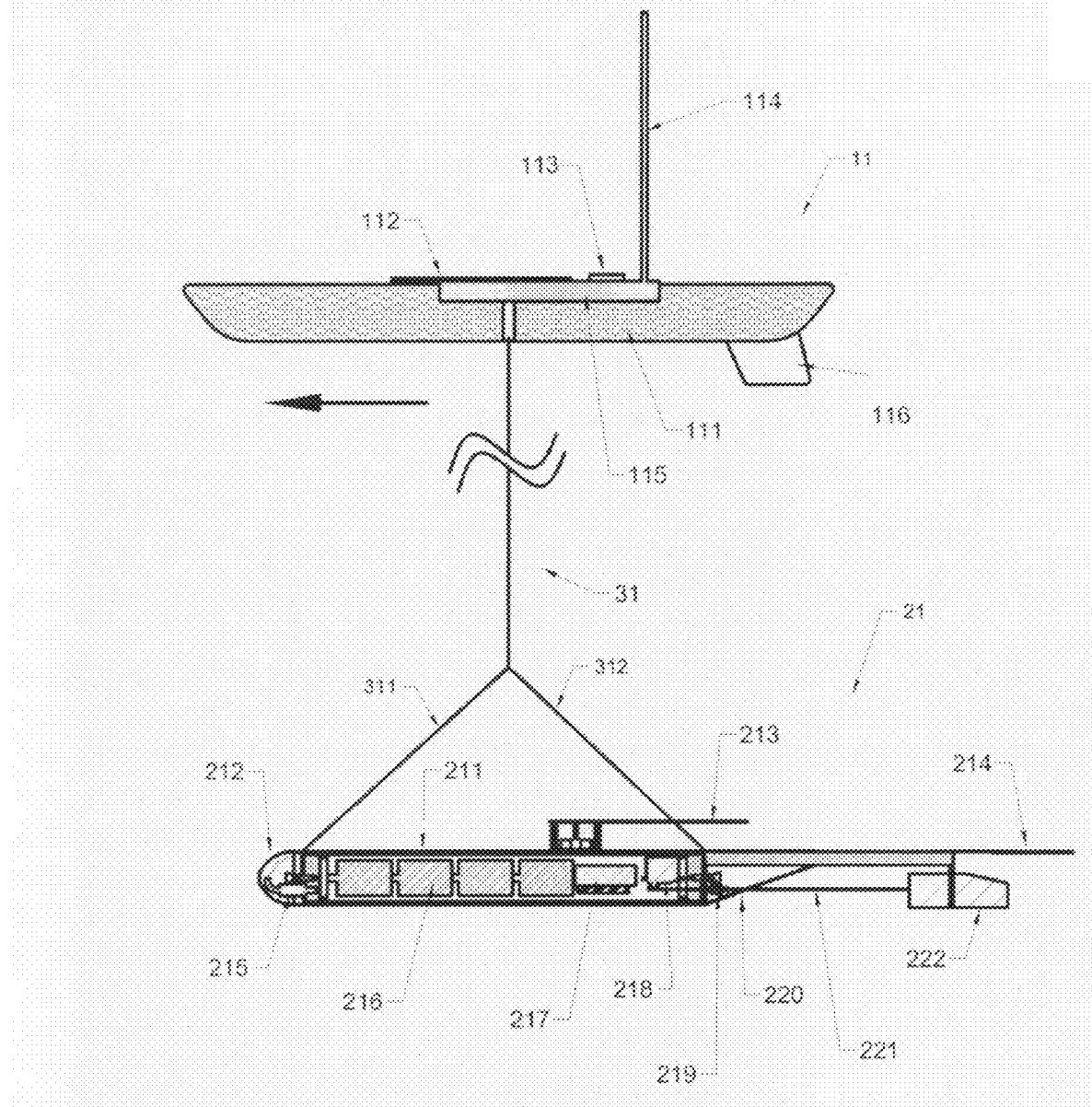
FIG. 1 is a diagram of a water vehicle.

In some Figures the shape of the fin system is not numbered. In others, the fin system is numbered 0, 1, 2, 3 or 4. If the configuration is numbered 0, it is the configuration when the vehicle is in still water. If the configuration is numbered 1, it is the configuration likely to be adopted when float is falling behind the wave crest, and the tension on the tether is falling (and may be zero). If the configuration is numbered 2, it is the configuration likely to be adopted when the float has fallen to the trough of the wave, and the tension on the tether starts to increase. If the configuration is numbered 3, it is the configuration likely to be adopted when the float is rising towards the top of a wave and the tether is at or close to its maximum tension for this particular cycle. If the configuration is numbered 4, it is the configuration likely to be adopted when the float is near the top of a wave crest and the tension on the tether has decreased.

DETAILED DESCRIPTION OF THE INVENTION

In the Summary of the Invention above, the Detailed Description of the Invention below, and the accompanying drawings, reference is made to particular features of the invention. It is to be understood that the disclosure of the invention in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments and Figures, and in the invention generally. It is also to be understood that this invention includes all novel features disclosed herein and is not limited to the preferred aspects of the invention set out above.

The term "comprises" and grammatical equivalents thereof are used herein to mean that other elements (i.e. components, ingredients, steps etc.) are optionally present. For example, a water vehicle "comprising" (or "which comprises") components A, B and C can contain only components A, B and C, or can contain not only components A, B and C but also one or more other components. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 5 to 15 feet" or "5-15 feet" means a range whose lower limit is 5 feet and whose upper limit is 15 feet. The terms "plural", "multiple", "plurality" and "multiplicity" are used herein to denote two or more than two items.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" elements, this is generally done for identification purposes; unless the context requires otherwise, the first and second elements can be the same or different, and reference to a first element does not mean that a second element is necessarily present (though it may be present). Where reference is made herein to "a" or "an" element, this does not exclude the possibility that there are two or more such elements (except where the context excludes that possibility). For example, where reference is made herein to a fin, or a fin system, the swimmer can (and frequently does) comprise two or more fins or fin systems, which may be the same or different. Where reference is made herein to two or more elements, this does not exclude the possibility that the two or more elements are replaced by a lesser number or greater number of elements providing the same function (except where the context excludes that possibility). For example, the swimmer body and the fin system can together form a single unitary body. The numbers given herein should be construed with the latitude appropriate to their context and expression; for example, each number is subject to variation which depends on the accuracy with which it can be measured by methods conventionally used by those skilled in the art.

Unless otherwise noted, the references to the positioning and shape of a component of the vehicle refer to that positioning and shape when the vehicle is in still water. Various terms are used in this specification in accordance with the definitions given above and the further definitions given below.

"Leading edge" (or leading end) and "trailing edge" (or trailing end) denote the front and rear surfaces respectively of a fin or other component as wave power causes the vehicle to move forward.

"Fore" and "aft" denote locations relatively near the leading and trailing edges (or ends) respectively.

"Aligned" denotes a direction which lies generally in a vertical plane which is parallel to the vertical plane which includes the longitudinal axis of the swimmer. "Axially aligned" denotes a direction which lies generally in the vertical plane which includes the longitudinal axis of the swimmer.

"Transverse" denotes a direction which lies generally in a vertical plane orthogonal to the vertical plane which includes the axial centerline of the swimmer.

Where reference is made herein to a feature which "generally" complies with a particular definition, for example "generally in a vertical plane", "generally laminar", or "generally horizontal", it is to be understood that the feature need not comply strictly with that particular definition, but rather can depart from that strict definition by an amount which permits effective operation in accordance with the principles of the invention.

All the components of the vehicle are preferably constructed of materials which are resistant to salt water, or enclosed within a watertight jacket of such material, particularly any electrical connections. Preferably, the materials which are exposed to the water are resistant to bio-fouling, and are unattractive or even repellent to marine animals, like sharks. Suitable materials can for example be selected from metals and polymeric compositions, including copper-containing paints and low surface energy polymers such as polytetrafluoroethylene. When the vehicle includes batteries and solar panels (or other electricity-generating means), bio-fouling can also be discouraged by using the power from the batteries or solar panels to briefly electrify conductive materials on the vehicle, and/or to energize a vibrator which will dislodge bio-fouling materials. Leading edges which may be snagged by seaweed can optionally have sharp or serrated edges.

The vehicle is preferably designed to minimize drag as movement of the swimmer pulls it forward, and to minimize the effect of winds and water currents which move the vehicle sideways. The float or the swimmer or both can have flaps which are folded-in and have little effect on drag when the float or swimmer is moving forward, but which fan out and increase drag when the float or swimmer is moving backwards. Such flaps are preferably positioned so that they keep the float and/or the swimmer in a desired orientation if it moves backwards.

The Swimmer Body

The swimmer body preferably has a generally cylindrical shape, or other shape selected to minimize drag as the fin system pulls the swimmer body through the water. Often there is a single body, but there can be a plurality of bodies secured to each other, preferably rigidly, with their axes aligned, or with their axes parallel to, and spaced-apart from, each other. Preferably the body has a longitudinal axis which is generally horizontal when the vehicle is in still water.

The length of the swimmer body can for example be at least 1 foot, e.g. 3 to 10 or 4 to 6 feet, but can be substantially greater, e.g. up to 1000 feet or more. The diameter (or, for non-cylindrical bodies, each of the minimum and maximum transverse dimensions) of the swimmer can for example be at least 0.1 feet, or at least 0.3 feet, up to, for example, 0.1 times the length of the swimmer.

In some embodiments the entire swimmer body will be rigid. However, it is also possible for part of the swimmer body to be elastically deformable. For example, the swimmer body can have a central section which is flexible, preferably substantially only in the vertical plane, with the rudder mounted on a rigid section aft of the flexible central section and the fin system mounted on a rigid section forward of the flexible central section. Optionally, the swimmer has a center of buoyancy which is above the center of gravity.

As further discussed below, a wide variety of additional components can be attached to the swimmer body. Heavy components are preferably secured to the swimmer rather than to the float. The wet weight of the swimmer, including the components attached thereto, can for example be 5-20,000 lbs, e.g. 5-500 lbs, for example 20-60 lbs. Many components are preferably placed within a watertight enclosure provided by the swimmer body (for example electrical equipment, including batteries, electronic equipment, servo mechanisms, watertight pass-throughs, and direction-finding equipment). Others are preferably or necessarily placed outside the swimmer body, for example stabilizer fins, stabilizer weights, rudders, some types of sensor, and sample collectors. Stabilizer fins, which can for example be placed near the front and/or near the rear of the swimmer body, can for example be generally vertical fixed and aligned fins which resist transverse drag on the swimmer, or generally horizontal fixed and aligned fins which resist vertical drag on the swimmer. Stabilizer weights can for example be bars and/or discs, usually aligned with the swimmer body, fixed to struts descending vertically from the swimmer body, thus increasing the weight and changing the center of gravity of the swimmer, or can be part of a keel-like vertical stabilizer fin.

In one embodiment, a hydrophone is secured to the swimmer body. Preferably, in order to separate the hydrophone from noise generated by the swimmer, the hydrophone is placed at the end of a cable dragged behind the swimmer body, or on an extension bar projecting from, e.g. from the front of, the swimmer body.

The Float.

The float can be of any convenient size and shape, bearing in mind the components which it carries, the way in which it will be used, and the desirability of minimizing drag in the water and against wind. The length of the float can be less than, e.g. 0.5 to 0.9 times, substantially equal to, e.g. 0.9 to 1.1 times, or greater than, e.g. 1.1 to 4 times, the length of the swimmer. The length of the float can for example be at least 1 foot, e.g. 3 to 10 or 4 to 6 feet, but can be substantially greater, e.g. up to 1000 feet or more, so long as it is not too large to be substantially moved by waves. The breadth of the float can for example be at least 0.3 foot, or at least 2 feet, up to, for example, 0.3 times the length of the float. Optionally, the float has a center of buoyancy which is above the center of gravity. The float can for example have 20-500 lbs, e.g. about 80 lbs, of buoyancy, and/or a buoyancy which is 2-4 times the wet weight of the swimmer.

To reduce the danger that wind, waves or current forces push the float sideways, preferably both the center of water drag and the center of wind drag are behind the line attachment point, since this helps to keep the float in a head-on orientation in which it has the lowest overall drag. Wind and water forces acting on the parts of the float forward of the tether attachment point tend to rotate the float away from the desired orientation, whereas those aft of the attachment point tend to produce the desired orientation. Therefore, the nose of the float is preferably is relatively blunt and truncated, whereas the tail portion of the float preferably has an extended tail portion with greater vertical surface area.

The float may include a rudder. The rudder may be fixed during some or all of the operation of the vehicle, in order to keep the center of drag behind the tether attachment point. The rudder may also be adjustable, in order to assist steering of the vehicle; in this case, the tether is preferably attached to the swimmer in front of the swimmer's center of drag. Especially when the tether is attached slightly forward of the center of buoyancy of the float, the submerged surfaces of the float may be shaped so as to produce forward thrust.

The float optionally comprises an outer shell comprising a polymeric composition, e.g. a fiberglass- or carbon fiber-reinforced polymeric composition, and/or a thick-walled elastomeric sheet material. The shell can optionally surround a closed cell polymeric foam core, e.g. a compliant closed cell foam, and/or a plurality of hollow cavities. In some embodiments, such cavities can optionally be inflatable (for example being composed of an elastomeric material), so that they can be partially or completely filled with water and/or air to control buoyancy.

The Tether

The tether connects the float and the swimmer mechanically, and for this purpose comprises a tensile member of suitable breaking strength, e.g. at least 500 or at least 1500 lb; the tensile member can for example be composed of a metal, e.g. stainless steel, and/or a polymeric composition, e.g. Kevlar or Spectra. Often, the tether also comprises one or more members which do not carry any load and which transmit electrical power and/or data, e.g. one or more twisted pairs of insulated electrical conductors, optical fibers or acoustic cables. Generally, the tether will support only tensile loads, but the invention includes the possibility that the tether will also resist compression, e.g. is a rod.

To reduce drag, the components of the tether are preferably arranged to minimize the area of the leading edge of the tether, with the primary tensile member at the front, and the tether optionally includes a jacket, preferably of streamlined cross-section, e.g. composed of a polymeric composition, e.g. a composition based on a silicone or vinyl chloride polymer, which surrounds the other components. Twisting of the tether increases drag, and optionally measures can be taken to reduce twisting. For example, a second tensile member can be present at the trailing edge of the tether, and/or the vehicle can include a device to detect and correct twisting of the tether, and/or the vehicle can be directed along a path in which the clockwise and anticlockwise turns are balanced (in particular, when the vehicle is directed along a path surrounding a fixed point).

The tether can for example have an aligned dimension of 0.5 to 1.0 inch, e.g. about 0.625 inch, a transverse dimension of 0.125 to 0.5 inch, e.g. about 0.19 inch, and a length of for example 10 to 80 feet, e.g. 17 to 23 feet. Either the float or the swimmer can include a reel or other equipment which makes it possible to change the length of the tether, either to suit particular wave conditions and/or water depth, and/or to make the vehicle more easily stored, carried and deployed.

The tether can for example include an elastomeric member, e.g. a spring, which changes in length reversibly when the relative positions of the float and swimmer change, for example in one leg of a tether generally shaped as an inverted Y.

In some embodiments, there is a single tether. The tether can for example have a central section which is a single line, and a lower section (attached to the swimmer) and/or an upper section (attached to the float) which has two or more legs, secured to fore and aft positions, or to transverse positions, on the swimmer or the float. In one embodiment, the tether has the shape of an inverted Y, the lower legs of the Y being (a) aligned with, and secured to fore and aft positions on, the swimmer, or (b) transverse to the swimmer and secured to components extending transversely from the axis of the swimmer.

When there is a single tether between the swimmer and the float, its configuration and point of attachment (or points of attachment, if the tether has two or more lower legs) to the swimmer are preferably such that the upward force exerted on the swimmer, when the tether is pulled upwards, passes through the swimmer at or close to the center of gravity of the swimmer. The swimmer is then substantially horizontal when the vehicle is in still water. This assists the swimmer to maintain a level orientation.

When there is a single tether between the swimmer and the float, its configuration and point of attachment (or points of attachment, if the tether has two or more upper legs) to the float are preferably such that the downward force exerted on the float, when the tether is pulled upwards, passes through the float near, or slightly forward of, the center of buoyancy of the float.

In other embodiments, there are multiple tethers, for example first and second tethers respectively attached to fore and aft positions on the float and the swimmer. Multiple tethers increase drag, but reduce twisting.

The tension force of the tether stabilizes both the swimmer and the float. While each element may also be independently stabilized by positioning of the center of floatation above the center of gravity, this is not necessary. The fact that the line tension stabilizes both the swimmer and float simplifies the control of the vehicle. In some embodiments, the vehicle only needs to be steered in one degree of freedom, and other attitude control is passively stabilized, making it unnecessary for the vehicle to include attitude control thrusters or flaps (although such thrusters and flaps can be present on the vehicles of the invention).

The Fin Systems

When the swimmer is being moved by wave power, the configuration of the fin system changes in cycles corresponding to the waves on the surface of the water. Generally, but not necessarily, the changes in the configuration in each cycle are substantially the same. The changes in the configuration in each cycle are generally substantially continuous, but can be discontinuous (i.e. there can be one or more periods in each cycle during which the configuration remains the same). During at least part of the cycle, the fin system interacts with the water to generate forces which thrust the swimmer in a horizontal direction. In some embodiments, the fin system comprises a fin which rotates about a transverse axis. In other embodiments, the fin system comprises a pair of fins which rotate about a longitudinal axis. In either case, as the swimmer rises and falls, the fin or fins can optionally undergo elastic distortion which enhances the forward thrust of the swimmer.

Various wave sizes will produce various motion amplitudes. With relatively large amplitude motions, the majority of the thrust will be produced during the upward and downward phases of fin motion. With relatively small amplitude motions these phases may be brief and a majority of thrust can be produced through the rotation of the fin structures. Flexible fins can produce thrust from both small amplitude motion and from large.

Different fin systems which interact with the water in the desired way include, but are not limited to, the various types described herein. A particular fin system can make use of combinations of two or more of these types, except when they are incompatible with each other; and a water vehicle can comprise two or more fin systems of the same or different types or combinations of types. Where reference is made below to a "generally laminar fin", this includes the possibility that the thickness of the fin changes, regularly or irregularly, in the transverse direction or in the aligned direction, or both, and the possibility that parts of the fin extend outwards from its generally laminar shape. Where reference is made below to a generally laminar fin which "lies in a generally horizontal plane", this includes the possibility that principal plane of the fin lies in a plane which is inclined to the horizontal at an angle which permits effective operation of the fin, for example at an angle which is not more than 45°, preferably not more than 20°, to the horizontal.

In some embodiments of the invention, part or all of the fin system has a first configuration when the vehicle is in still water; is converted from the first configuration into a second configuration when the swimmer is pulled upwards by the tether as a result of a wavecrest lifting the float upwards; and is converted from the second configuration into a third configuration when the swimmer sinks downwards as a result of a wavetrough allowing the float to descend. The third configuration will generally be different from the first configuration, but the invention includes the possibility that it is the same as the first configuration. When the fin system is converted from the second configuration to the third configuration, it can, but need not, pass through the first configuration as a transitory state. The fin system can for example comprise one or more fins comprising generally laminar portions which deform elastically between the different configurations. Alternatively or additionally, the fin system can for example comprise one or more elastically deformable components, which change shape between the different configurations, and thus control, or help to control, the movement of fin or fins comprising generally laminar portions. The elastically deformable component can control, or help to control, the movement of a fin in one direction only (e.g. a spring) or in both the upward and downward direction (e.g. a torsion bar).

Limit stops may be included to prevent overstressing of a flexure. The stop may be a rigid stop, an elastic stop, e.g. a spring, or an increasing rate spring may be used for the flexure.

The fin system comprises at least one fin, the fin preferably having one or more of the following characteristics:—
 (a) it is at least in part elastically deformable;
 (b) it comprises a leading portion which is relatively rigid and a central portion and/or a trailing portion which is relatively and elastically deformable;
 (c) it comprises a leading portion which is relatively and elastically deformable, a central portion which is relatively rigid, and a trailing portion which is relatively and elastically deformable;
 (d) it has a shape similar to the shape of the tail of a fish or a whale;
 (e) in the first configuration, it is generally planar in a generally horizontal plane; and
 (f) in the second configuration, it is generally laminar and downwardly curving, the second configuration being a result of flexing and/or rotating the fin about an axis which lies in a plane which is generally orthogonal to the tether and generally at right angles to the longitudinal axis of the swimmer; and
 (g) when the swimmer sinks downwards as a result of a wavetrough causing the float to fall, the fin system changes from the second configuration to the third configuration, the third configuration being generally laminar and upwardly curving.

Other optional features of the fin system include:—
(1) the fin system comprises a plurality of fins mounted to a frame, for example a plurality of fins mounted to both sides of a spine, or a plurality of fins mounted between side rails;
(2) the fin system comprises a pair of fins, the fins
 (i) extending away from opposite sides of the swimmer body,
 (ii) being secured to the swimmer body so that they can move between the first and second configurations, the position of the fins in the second configuration extending upwards relative to the position of the fins in the first configuration, and
 (iv) being biased by a spring or other elastic recovery means into the first configuration and away from the second configuration;
(3) the fin system comprises a pair of fins and the tether comprises an inverted V-shaped section having two legs, each leg being secured to one of the fins; and
(4) the fin system comprises a caudal fin;

In the first aspect of the invention, the fin system optionally comprises at least one additional member whose shape is fixed and is such that that the additional member directly or indirectly generates desired forces as the swimmer is moved by the movement of the float. In one embodiment of the second aspect of the invention, such members are the sole means for generating the desired forces.

The optimum amount of flexibility for a flexible fin will depend on many characteristics of the design and of the wave characteristics anticipated. If the fin is too flexible, then the curvature during the large amplitude motion may be so large that the trailing portion of the fin may flex to be parallel to the direction of motion and thus generate little thrust. If the fin is too rigid, then the fin will not flex with any inflections and small amplitude inputs will not efficiently generate thrust.

The fin system often includes a rigid component which is secured to, preferably positioned above, the body of the swimmer. The rigid component can for example have one or more of the following characteristics.
 (i) it is rigidly fixed to the body portion,
 (ii) it is positioned above the body portion and a unitary tether, or one leg of a tether having an inverted Y configuration, is secured thereto,
 (iii) at least one fin system is secured thereto, the fin systems, when there is more than one fin system, being mounted one above the other and/or beside each other,
 (iv) it is the first component of a support system which also comprises a second rigid component; the first component being positioned above, and secured directly to, the body portion in a generally vertical plane when the vehicle is in still water, and the second component being secured directly to the first component and having one or more fin systems secured thereto; the second component optionally being secured to the first component so that the second component can be rotated relative to the first component in a generally vertical plane; and the rotation optionally being influenced by an elastically recoverable member, e.g. a spring or a torsion bar; and at least part of the tether optionally being secured to the second component so that upward pulling of the tether distorts the elastically recoverable member, the extent of rotation optionally being further limited by an inextensible member;

In some embodiments, a generally planar fin or a pair of generally planar fins undergoes elastic deformation in the transverse direction (and may also undergo elastic deformation in the aligned direction). In some cases, such fins can move vertically without substantial vertical motion of the swimmer body. They flap in a manner similar to the pectoral fins on a fish, or the wings on a bird. Preferably the fin or fins rotate about an axially aligned longitudinal axis. Optionally, the fin surfaces can also rotate and/or flex relative to the horizontal plane or relative to a plane that intersects the longitudinal axis and an axis through the wing spar.

Pectoral fins of this kind are preferably directly actuated by the tether, thus reducing motion of the swimmer body. In some cases, this makes them well suited for large swimmers or for applications where the swimmer body should be held relatively steady.

By attaching the legs of the tether to different points along the length of the pectoral fins, the amount of fin motion relative to the amount of line motion may be adjusted.

Pectoral fins may for example have an internal skeletal structure made of a less flexible, optionally substantially rigid, material with high fatigue life such as tempered steel or carbon fiber composite. The skeletal structure can include a front spar that makes the leading edge relatively rigid. The primary flexion of the skeletal structure occurs in vertical bending of the front spar near the attachment to the body. The rigidity of the front spar may increase toward the outer parts to prevent the wing tips from drooping. The trailing edge of the wing can for example be comprised only of the elastomer jacket material and be relatively flexible.

The tether is preferably attached to the wing skeletal structure at two points, one on each wing. The wing structure is preferably such that when the tether is not under tension, the fin flexes downward; and when the vehicle is in still water, the fins flex to a relatively flat position. Increased line tension will cause the wings to flex upward.

The line attachment points are preferably toward the front edge of the wings. The center of gravity (COG) is preferably under the line junction point so that the swimmer body is horizontal in still water. If there is more fin area behind the line attachment, upward motion will cause the swimmer to pitch nose up. If there is more fin area is behind the COG, downward motion will cause the swimmer to pitch nose down. Optionally, a rudder steers the swimmer. Optional features of swimmers of this type can include:

(a) A smooth outer body which has no exposed mechanism and is resistant to fouling.
(b) Flexion distributed over a large area so that fatigue at specific points can be minimized for long life.
(c) A streamlined overall shape which enables increased speed.
(d) Sudden increases in tether tension are transmitted immediately to fins so that the inertia of the vehicle does not impeded conversion to thrust.
(e) The tips of the fins extend beyond the line attachment points and the wing spar is relatively rigid in this region, so that the tips of the fins move through a larger amplitude than the tether. This helps generate large amounts of thrust from small amounts of tether motion.

Additional Components.

Additional components which can be part of the vehicle include, but are not limited to, the following. Some components, e.g. electronic control equipment, can be part of either or both of the float and the swimmer. Bulky or massive items, e.g. batteries, and equipment that operates best with limited motion and/or when protected from wind and noise, such as imaging or mapping equipment, and hydrophones and sonar equipment, are preferably part of the swimmer. Other components, e.g. solar collection means, radio and navigation antenna, beacons and weather sensors are preferably part of the float.

Examples of additional components include, but are not limited to, the components set out in paragraphs 1-14 below.

(1) Communications equipment for sending and/or receiving data, e.g. digital or analog radio signals, for example communications equipment for
  (i) sending signals which reflect data collected by a monitoring or sensing device which is part of the vehicle;
  (ii) receiving signals, e.g. commands, from a base station (e.g. a ship or a ground station) or from navigation devices, for example satellite navigation equipment such as a global positioning satellite (GPS), or sonar or radio buoys,
  (iii) sending signals to a receiving station, for example via a satellite,
  (iv) sending signals which are influenced by the location of the vehicle.
(2) Recording equipment for recording signals, e.g. digital or analog signals, for example signals which are
  (i) influenced by signals from a satellite navigation system, e.g. GPS;
  (ii) sent from the vehicle to a receiving station, for example via a satellite;
  (iii) influenced by the location of the vehicle; or
  (iv) influenced by a sensor which is part of the vehicle, e.g. a hydrophone attached to the swimmer;
(3) Control electronics for controlling equipment forming part of the vehicle.
(4) Steering means, for example a rudder forming part of the float and/or a rudder forming part of the swimmer, the steering means being for example a fixed rudder on the float (e.g. to keep the center of drag behind the point at which the tether is attached to the float), and/or a rudder or other steering means which is attached to the swimmer and which includes a rudder actuator responsive to signals generated within the vehicle, e.g. from a magnetic compass or a gyroscope, and/or received by communications equipment forming part of the vehicle.
(5) Electrical power sources, for example batteries or fuel cells, preferably power sources that can be recharged, for example by output from solar cells mounted on the float. Batteries, because they are heavy, are preferably placed within the container body of the swimmer. There can be, for example, four to ten 6 volt lead acid batteries.
(6) Means for utilizing solar energy, e.g. solar panels or solar cells mounted on the float.
(7) A sensor, this term being used to denote any device which reports, or responds to a change in, any observable condition. Thus the sensor can be any one of a large variety of scientific or surveillance devices, for example a compass, a gyroscope, a temperature sensor, a pressure sensor, a sensor of any type of electromagnetic radiation, e.g. visible, ultraviolet or infrared light, a chemical sensor, e.g. a salinity sensor, a magnetometer, a biological sensor, a geological sensor, a water current sensor, a depth sensor, a speedometer, equipment for imaging the sea floor, a sensor of weather or other climatic changes, e.g. windspeed, rainfall, or barometric pressure, or a hydrophone (for example a hydrophone for monitoring the sounds made by whales or other aquatic life).

In some embodiments, because the vehicles of the invention do not need to include conventional propulsion components, or other noisy components, they provide excellent platforms for noise-sensitive devices and do not have any adverse effect on noise-sensitive devices carried by other equipment, e.g. other water vehicles.

(8) Auxiliary propulsion means, e.g. a motor-driven thruster.
(9) Auxiliary attitude control means, e.g. flaps.
(10) Means for reversibly altering the buoyancy of the float. Such means include, for example, chambers which can be inflated with air to increase buoyancy and deflated to reduce buoyancy, and/or chambers which can be filled with water to decrease buoyancy and evacuated to increase buoyancy. In this way, the float can be maintained at a desired level in the water (including submerged). Reducing buoyancy is valuable, for example, when adverse weather conditions might endanger the vehicle, particularly if the vehicle is relatively small. Such chambers can for example comprise valves, e.g. one-way valves, which are controlled by computers responding to input from sensors on the vehicle itself or from radio signals. The energy needed to inflate and/or to evacuate such chambers can be derived directly from waves striking the float, and/or from the wave power generated by the relative movement of the float and the swimmer, and/or from stored electrical power. For example, a chamber can comprise a flexible portion which will act as a pump when struck by waves, and which will either fill or empty the chamber, depending upon the position of the valves. Alternatively or additionally, the float can comprise one or more chambers with the one or more inlets through which water can enter when waves are high but not when waves are low, and one or more outlets from which the water can drain when waves are low.
(11) Equipment for collecting samples, for example samples of water, air, aquatic organisms, sea animals, vegetables or minerals.
(12) Equipment for utilizing wind energy, e.g. to recharge batteries.
(13) Auxiliary electrical equipment, for example lights, beacons, or a motor driving a propeller.
(14) Means for converting part or all of the movement of the swimmer into electrical energy.

In preferred embodiments, it is possible to operate surface components, e.g. solar cells and/or radio, and a submerged component simultaneously, so that data transmission can be "real time". It is also possible to plan alternating phases of data collection and transmission.

Directing the Vehicle along a Desired Path

In some uses of the invention, the vehicle is directed along a desired geographical path by using a computer attached to the float or the swimmer, or both, the computer being used
    (a) to process (i) input from a magnetic compass or gyroscope (preferably attached to the swimmer), (ii) input from a satellite navigation system, e.g. GPS (preferably attached to the float), and (iii) geographical coordinates preprogrammed into the computer and/or input to the computer by radio commands; and
    (b) to output commands to (i) a rudder control system which controls a rudder or rudders on one or both of the float and the swimmer, preferably on the swimmer, and (ii), if the vehicle has auxiliary control or propulsion means, to those means. The input to the computer can include data available from other sources, e.g. to take account of winds and currents.

In other uses of the invention, the vehicle is directed along a path which is determined by using a computer attached to the float or the swimmer, or both, the computer being used to
    (a) process input from a sensor attached to the vehicle itself, or from a network of vehicles, one or more of which are vehicles of the invention, and
    (b) output commands to (i) a rudder control system which controls a rudder or rudders on one or both of the float and the swimmer, preferably on the swimmer, and (ii), if the vehicle has auxiliary control or propulsion means, to those means.

In this way, for example, a hydrophone, magnetometer or other sensor on the vehicle could identify the presence of an object in or on the water or on the seabed, e.g. a ship or other floating or submerged object, or a whale or other sea creature, and the vehicle could be directed to follow a path related to that object, e.g. to track the movement or presence of that object.

The operation of the vehicle can be controlled by signals sent to it from a remote control station and/or by signals generated by the vehicle itself, optionally in conjunction with one or more preprogrammed command structures forming part of the vehicle itself.

Station-Keeping.

One way of keeping the vehicle close to a fixed point ("station-keeping") is to direct the vehicle towards the fixed point at regular intervals, e.g. of 1-10 minutes. If the vehicle has overshot the fixed point, it turns at the end of the interval. Successive turns are preferably clockwise and anticlockwise, to reduce the risk of twisting the tether, and each of the turns is preferably as small as is consistent with the avoidance of twisting the tether. Another way is to direct the vehicle along a generally figure-of-eight path, with the center of the path being the fixed point, and with the vertical axis of the path aligned with any ocean current. The vehicle follows a straight line between each of the turns, and again successive turns are clockwise and anticlockwise; and, if the time spent outside a zone defined by the straight sections of the path is important, each of the turns is preferably as small as is consistent with the avoidance of twisting the tether.

Speed Control

In many applications, it is unnecessary to control the speed of the vehicle. However, if such control is desired, it can for example be provided by measures such as controlling the angle of attack of fins, allowing the fins to feather, and holding the fins stiff, to decrease their efficiency when less thrust is desired. If there are fins on each side of the swimmer body, these measures can also be used to steer the swimmer.

The Drawings.

FIG. 1 shows a float 11 is connected to a swimmer 21 by a tether 31. The float comprises a body 111 on which are mounted solar panels 112, GPS receiver 113, antennae 114, and electronics box 115. A rudder 116 is secured to the rear of the float. Tether 31 having an inverted Y shape with lower legs and 311 and 312, connects the float and the swimmer. The swimmer comprises a body 211 having a nose cone 212. Mounted on the exterior of the body 211 are fin systems 213 and 214. Enclosed within the body 211 are electrical pass-through 215 for leg 311 of the tether, batteries 216, control electronics 217, rudder servo mechanism 218 and rudder rod pass-through 219. A rudder 222 is mounted at the rear of the swimmer body and is controlled by rudder actuation rod 221.

Figure 2:
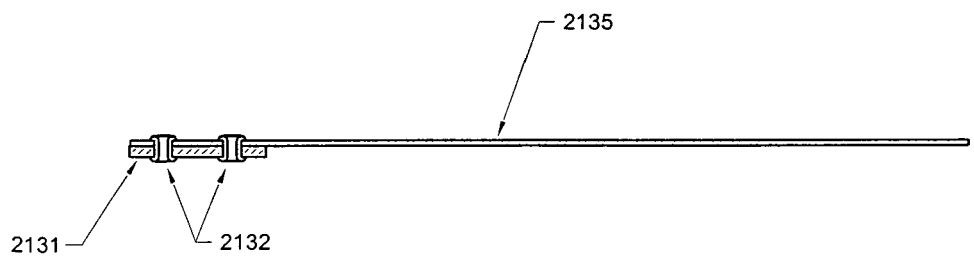
FIGS. 2 and 3 are cross-sections of fins for use in certain embodiments.
Figure 3:
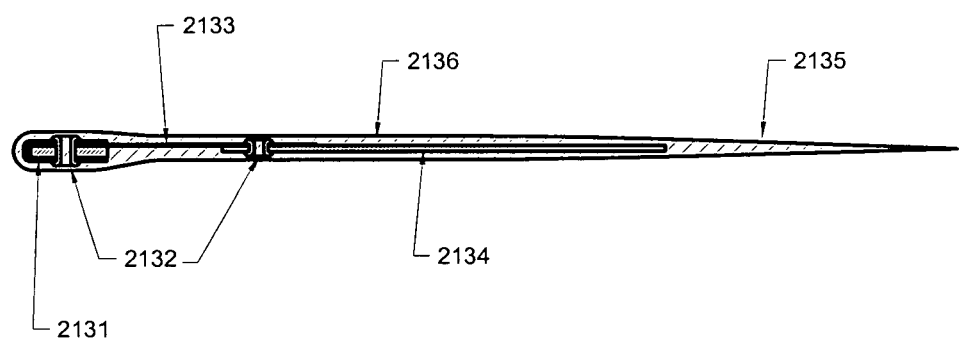

FIGS. 2 and 3 are cross-sections of fins which can be used in the present invention. Each comprises a rigid front spar 2131, which may for example be composed of a sheet metal sandwich composite and/or have a steel core, a relatively inflexible central sheet section 2134, which may for example be composed of metal and/or fiberglass, and a relatively flexible trailing sheet section 2135. In FIG. 3, there is in addition a relatively flexible fore sheet section 2133, and the flexible trailing sheet is integral with a flexible outer jacket 2136. The various sections may be bonded or held together with fasteners such as rivets 2132

Figure 4:
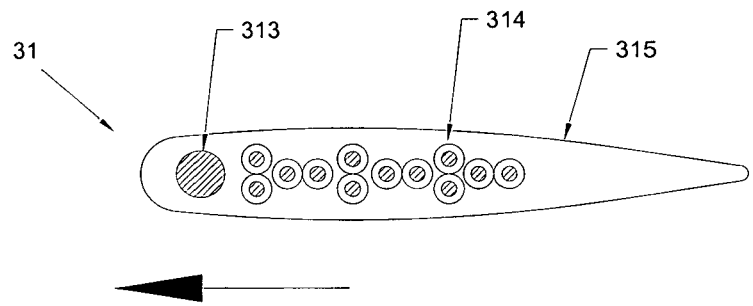
FIG. 4 is a cross-section of a tether.

FIG. 4 is a cross-section of a tether 31 which comprises a tensile member 311, six twisted pairs of insulated electrical conductors 314, and a streamlined polymeric jacket 315.

Figure 5:
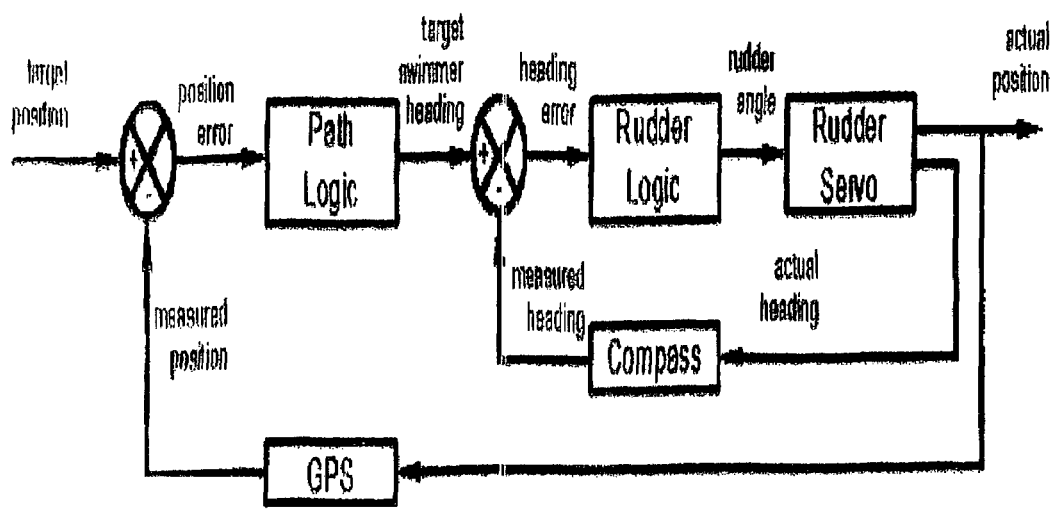
FIG. 5 is a block diagram of a control system.

FIG. 5 is a block diagram of a control system for directing the vehicle along a desired path. Other control systems can be used.

Figure 6:
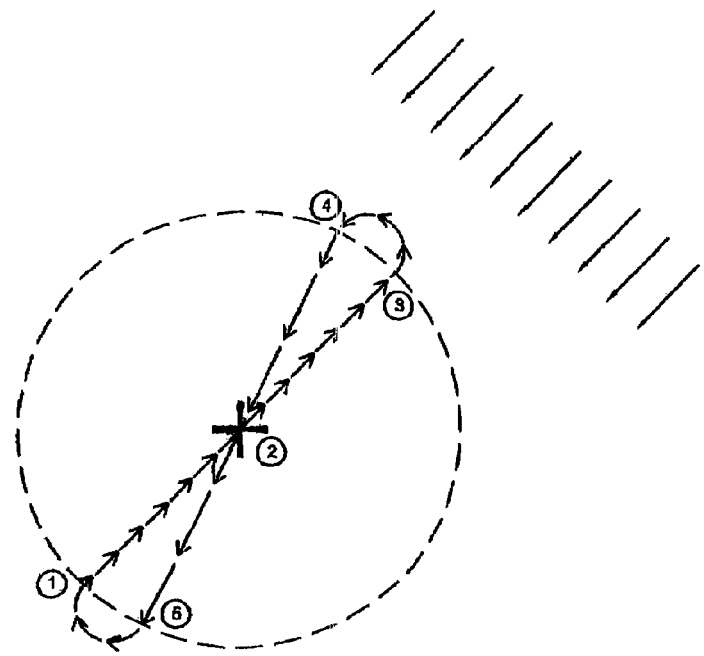
FIG. 6 shows a path for a station-keeping water vehicle.

FIG. 6 shows a closed generally figure-of-eight path followed repetitiously by a vehicle to keep it within a target zone around a fixed point 2 (except when it is turning outside the zone). The axis of the path is aligned with the ocean current. The vehicle follows a straight path between points 1 and 3, passing through point 2. At point 3, control systems on the vehicle note that the vehicle has reached the perimeter of the target zone, and operate a rudder so that the vehicle turns anticlockwise between points 3 and 4. The vehicle then follows a straight path between points 4 and 5, again passing through point 2. At point 5, the control systems operate the rudder so that the vehicle turns clockwise between points 5 and 1. If the vehicle is moved by wind and/or current in addition to wave power, auxiliary propulsion means may be needed to maintain the vehicle within the target zone.

Figure 7:
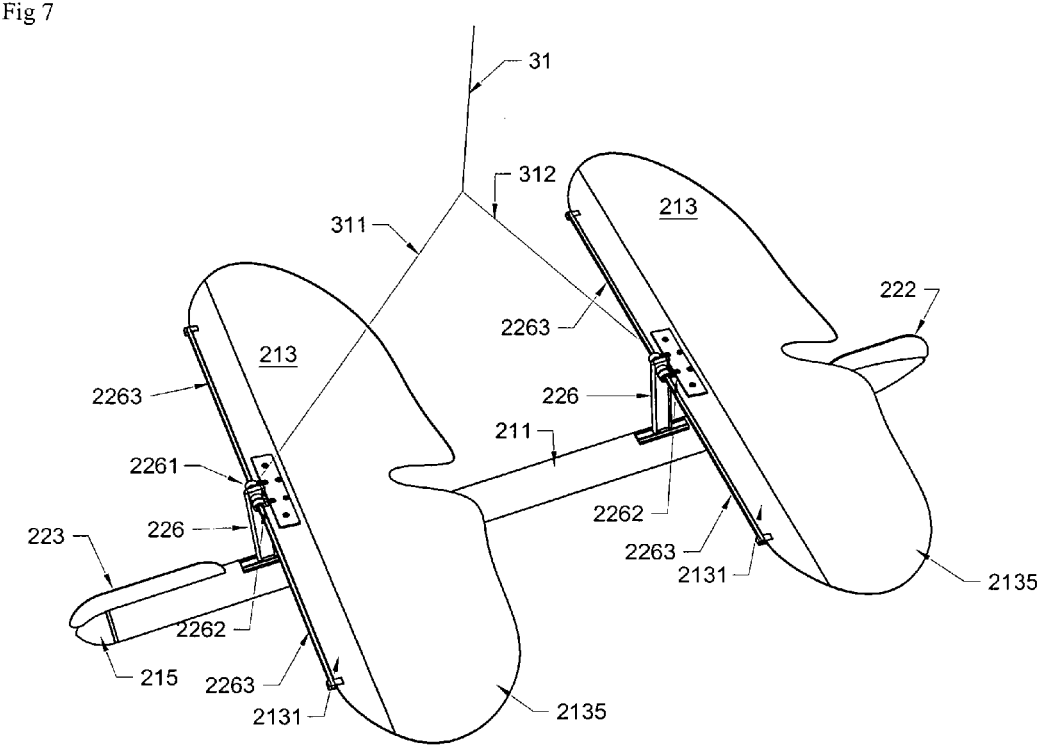
FIG. 7 is a perspective view of a water vehicle.

FIG. 7 is a perspective view of a swimmer 21 and tether 31. Two substantially identical fin systems, each comprising a rigid vertical post 226 and a fin 213, are secured to swimmer body 211. Tether legs 311 and 312 are attached to the tops of the posts 226. Each fin comprises a relatively rigid front spar 2131 and a relatively flexible rear section 2135 shaped so that the fin can operate without striking the swimmer body; the fin optionally includes one or more intermediate sections (not shown) having relatively greater or lesser flexibility. A hinge structure 2262 is bolted to each front spar 2131 and rotates around pivot shafts secured to the posts 226. Each of four torsion bars 2263 is fixed at one end to one of the vertical posts and at the other end to a front spar as a location selected to provide a desired degree of control over the rotation of the front spar. Each fin can for example have a cross-section generally as shown in FIG. 2 or FIG. 3. Rigid vertical fins 222 and 223 are secured to the trailing and leading ends respectively of the swimmer body. Fin 223 is fixed. Fin 222 can be controlled to rotate about a vertical axis.

Figure 8:
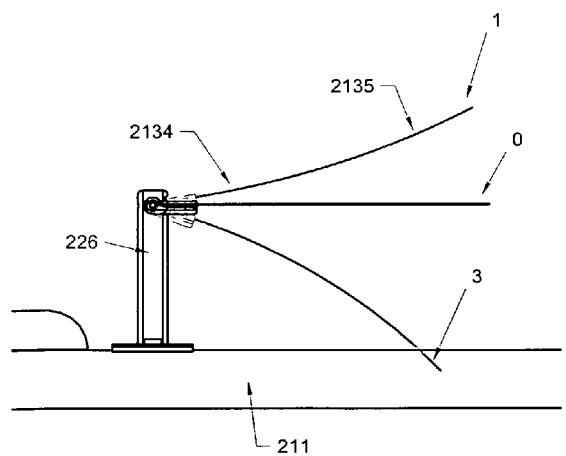
FIG. 8 shows different configurations of a fin in FIG. 7.

FIG. 8 shows how the shape of the fins in FIG. 7 changes as the swimmer is pulled up and down by wave motion.

Figure 9:
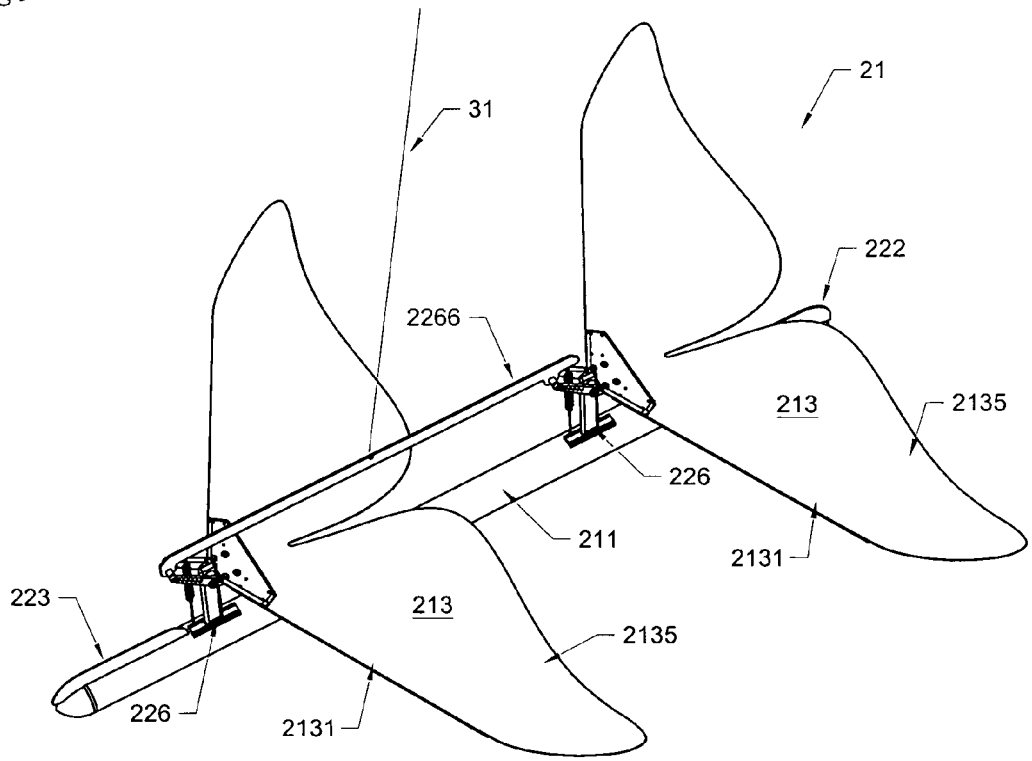
FIG. 9 is a perspective view of a water vehicle.
Figure 10:
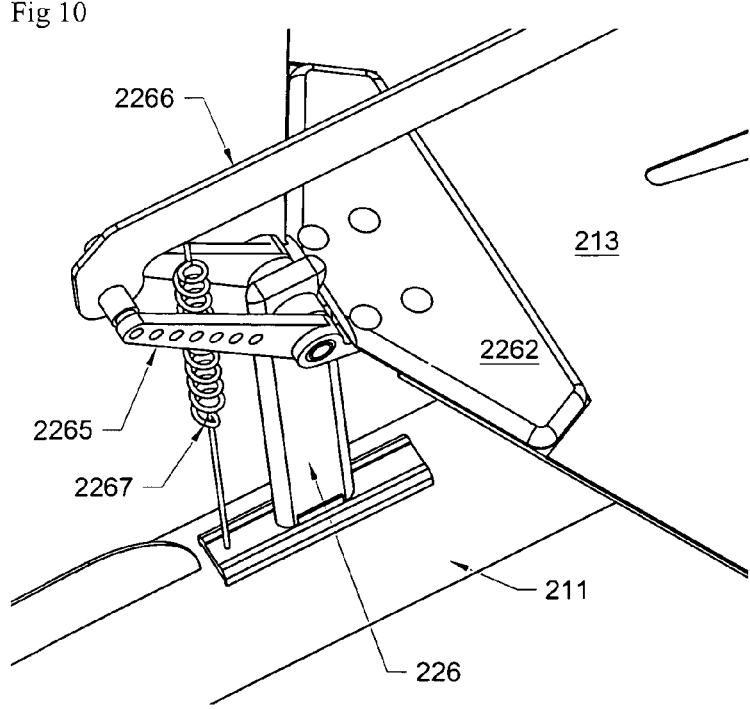
FIG. 10 is an enlarged perspective view of part of FIG. 9,
FIGS. 11A to 11D show different configurations of the fins in FIG. 9,
FIGS. 12-19 and 21 are side views of water vehicles.

FIG. 9 is a perspective view of a swimmer 21 and tether 31, and FIG. 10 is an enlarged perspective view of part of FIG. 9. Two substantially identical fin systems, each comprising a rigid vertical post 226 and a fin 213, are secured to swimmer body 211. Each fin comprises a relatively rigid front spar 2131 and a relatively flexible rear section 2135 shaped so that the fin can operate without striking the swimmer body; the fin optionally includes one or more intermediate sections (not shown) having relatively greater or lesser flexibility. A hinge bar 2262 is bolted to each front spar 2131. Bars 2265 are secured to the hinge bars 2262. One end of each bar 2265 is rotationally secured to a pivot shaft at the top of one of the posts 226, and the other end is rotationally secured to longitudinal bar 2266 which joins the bars 2265 attached to the respective posts. Springs 2267 are secured to the swimmer body and to the bar 2266. Tether 31 is secured to the longitudinal bar 2266. Rigid vertical fins 222 and 223 are secured to the trailing and leading ends respectively of the swimmer body. Fin 223 is fixed. Fin 222 can be controlled to rotate about a vertical axis. In a similar embodiment (not shown), the springs are rotationally attached to the bars 2265 instead of the bar 2266.

Figure 11A:
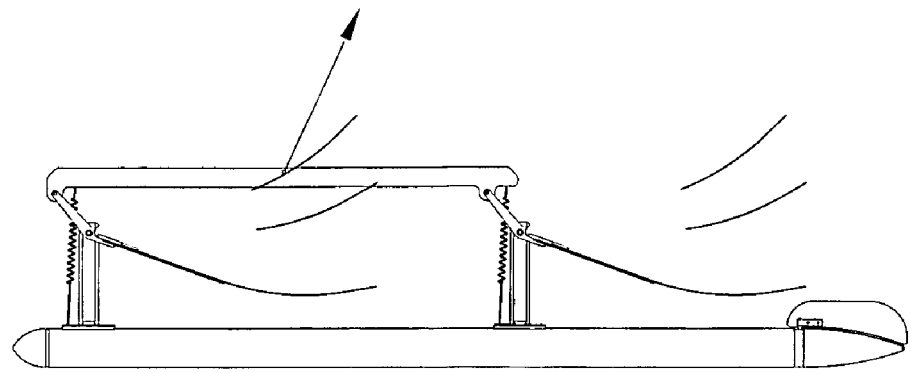
Figure 11B:
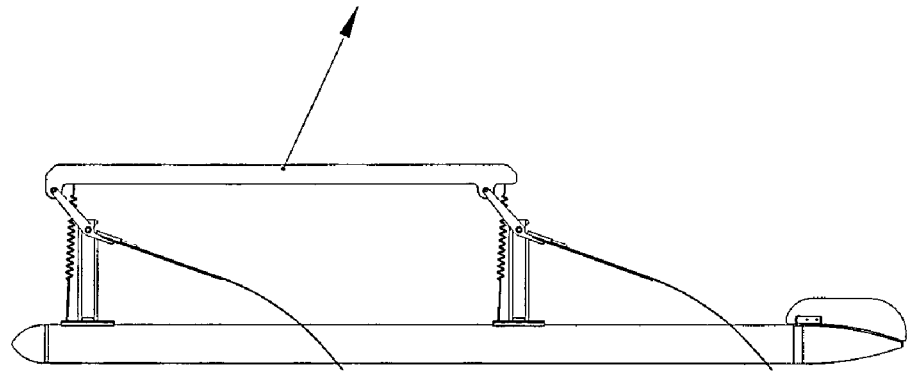
Figure 11C:
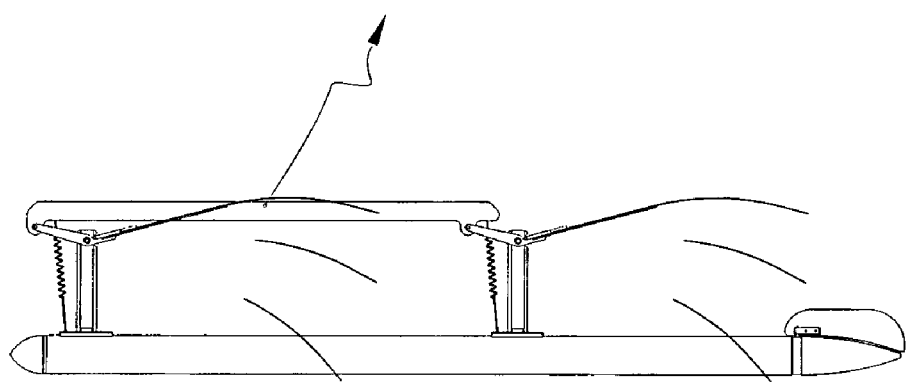
Figure 11D:
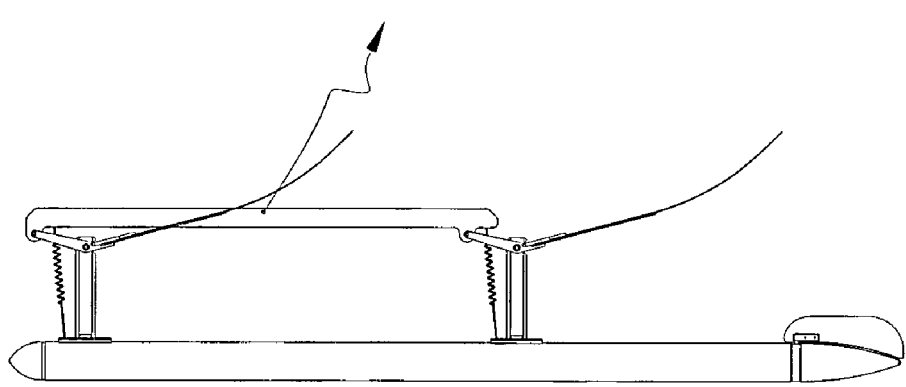

FIGS. 11A to 11D show how the shape of the fins in FIG. 9 changes as the swimmer is pulled up and down by wave motion. In FIG. 11A, the swimmer is being pulled upwards; the tether tension increases and pulls the bar 2266 upwards, stretching the springs 2267; the leading edges of the fins rotate downwards, and the trailing sections of the fins curl upwards, producing thrust from the bottom surfaces of the fins; and the swimmer body moves upwards. In FIG. 11B, the tether tension remains high; after the rotation of the leading edge of the fin reaches its mechanical limit, and the trailing sections of the fins curl downwards, producing thrust from the top surface of the fin; the swimmer continues to rise. In FIG. 11C, the tether tension has decreased; the springs 2267 pull the bar 2266 downwards; the leading sections of the fins rotate upwards, and the trailing sections of the fins curl downwards, producing thrust from the top surfaces of the fins; and the swimmer moves downwards. In FIG. 11D, the tether tension remains low; the leading sections of the fins remain rotated upwards, and the trailing sections of the fins curl upwards, producing thrust from the bottom surfaces of the fins; and the swimmer continues to move downwards.

FIGS. 12-21 show the swimmer of different water vehicles of the invention. In each, a swimmer 21 has a center of gravity 230 and comprises a swimmer body 211, a nose cone 212 and a rudder 222. Secured to the swimmer body is a fin system comprising vertical post(s) 226 and one or more fins, each fin comprising two or more of flexible inner section 2133, rigid section 2134 and flexible outer section 2135.

Figure 12:
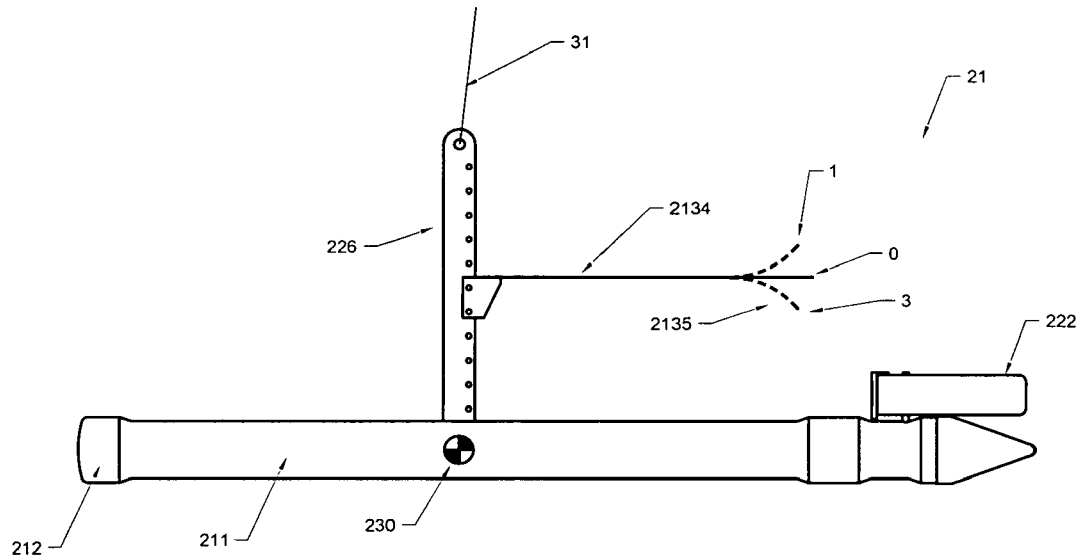
Figure 13:
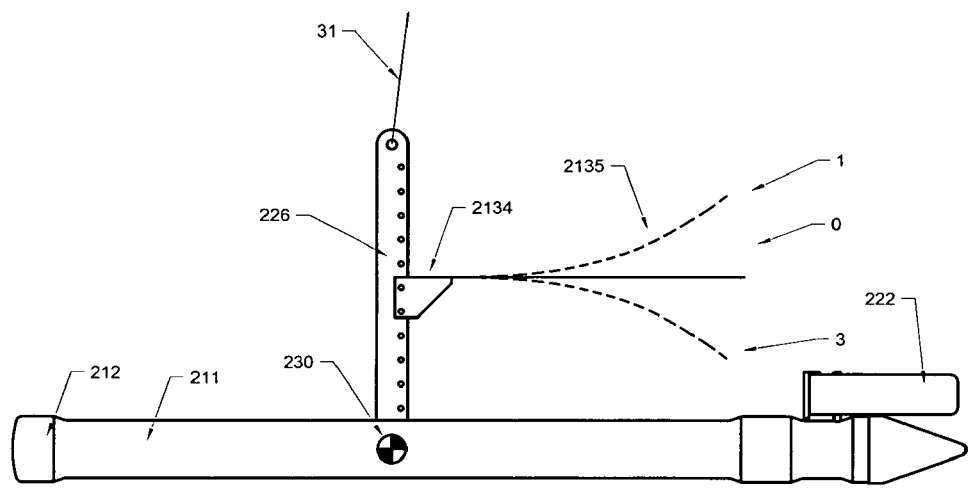
Figure 14:
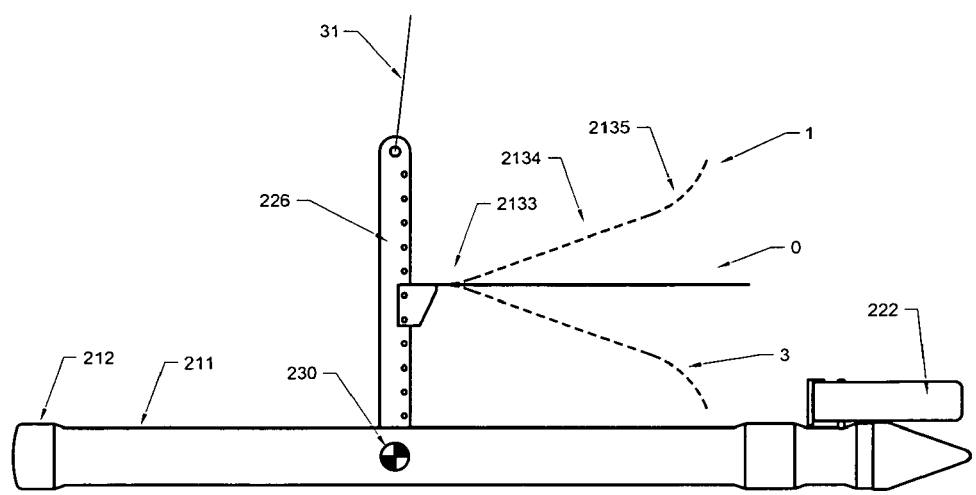
Figure 15:
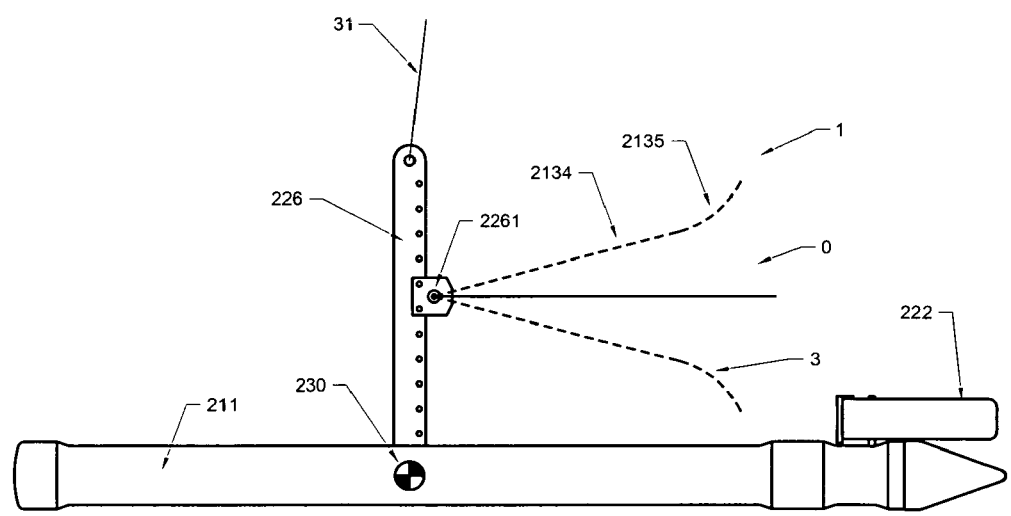
Figure 16:
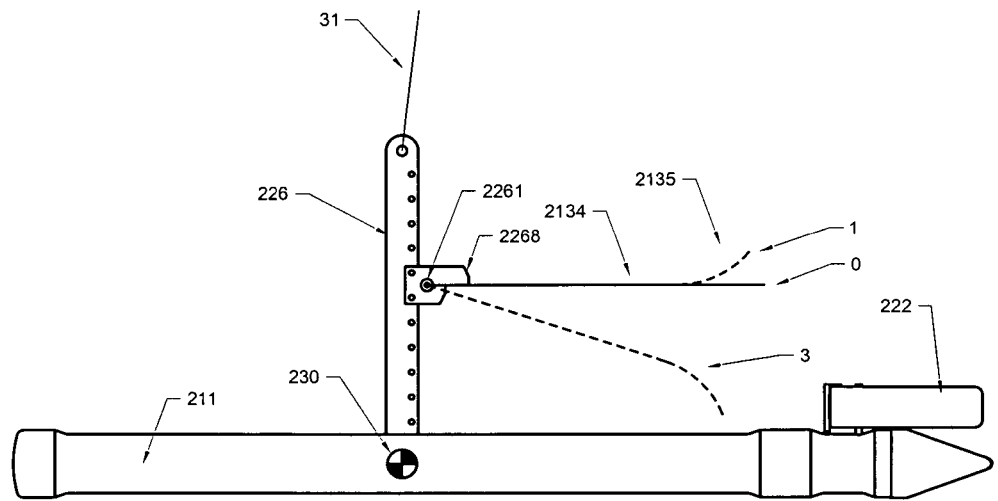

In FIGS. 12-16, there is a single post, and a tether 31 is secured to the top of the post. In FIGS. 12-14, the leading edge of a single fin is fixed to an intermediate position on the post. In FIGS. 15 and 16, the leading edge of a single fin is rotatably secured about pivot point 2261 at an intermediate position on the post. In FIG. 16, stop 2268 limits rotation of the leading edge of the fin.

Figure 17:
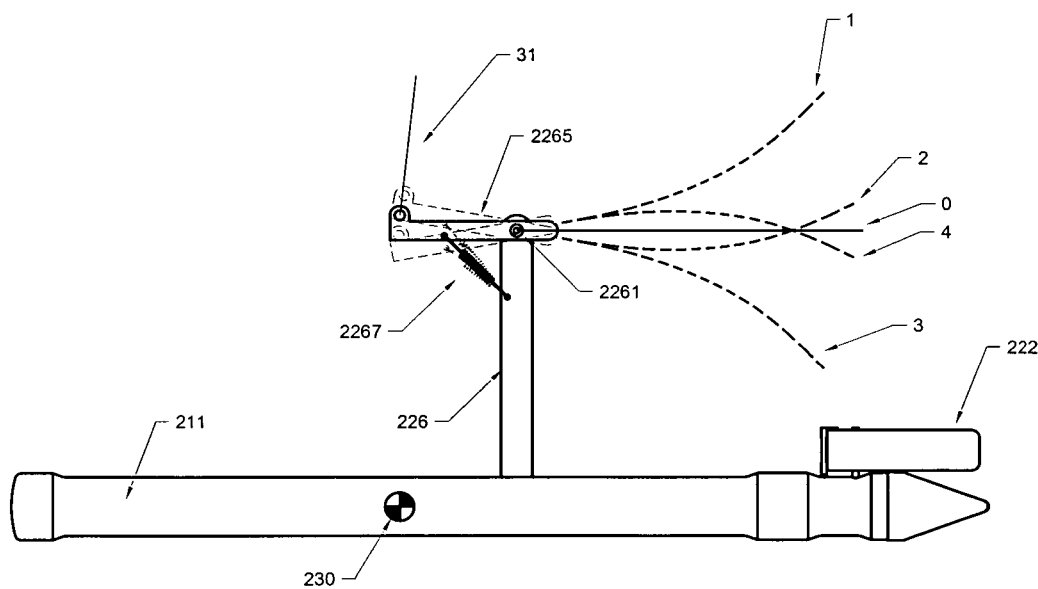
Figure 18:
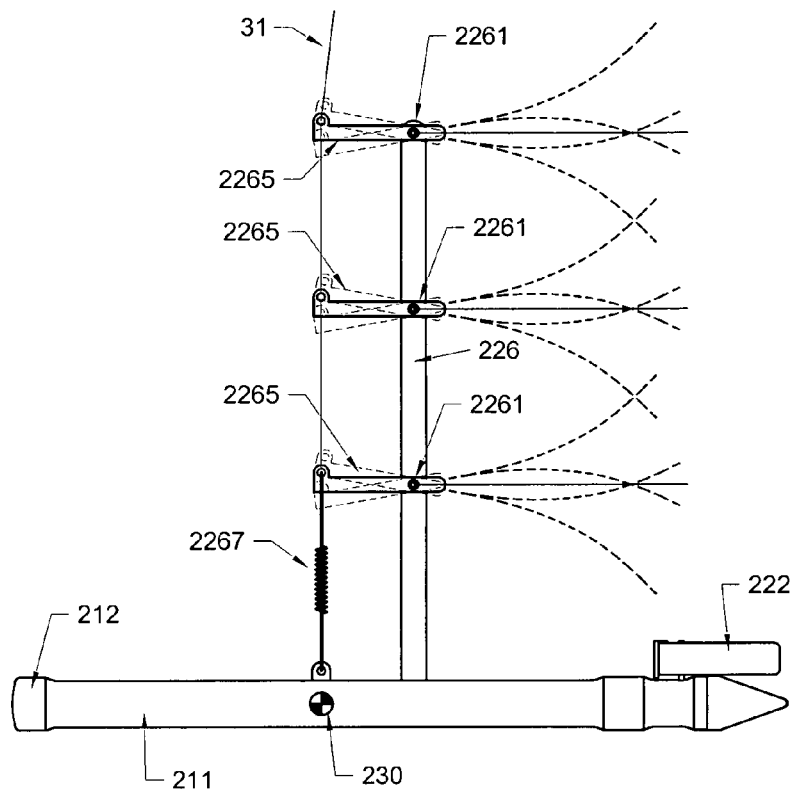
Figure 19:
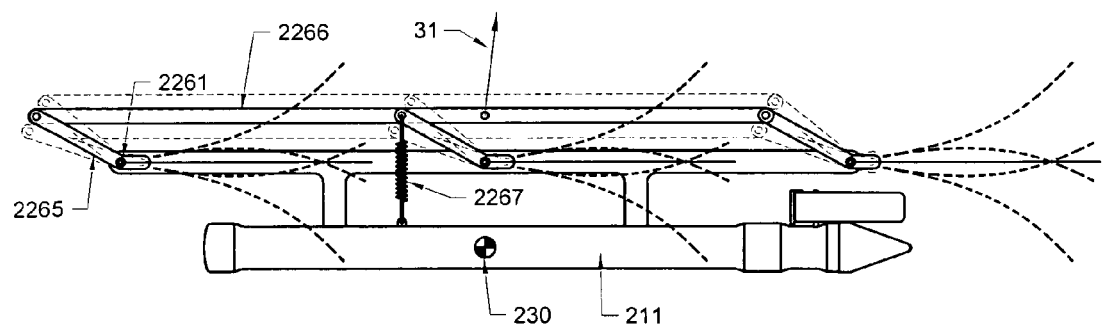

In FIG. 17, there is a single post having a bar 2265 rotatably secured to its top. The leading edge of the fin is secured to one end of the bar 2265, and tether 31 is secured to the other end of the bar 2265. Rotation of the bar 2265 is controlled by spring 2267 secured to the post and the bar. FIG. 18 is similar to FIG. 17, except that there are three bars 2265 with attached fins, the tether 31 is secured to the top bar, and a line secured to the tops of all three bars and to the swimmer body includes the spring 2267. FIG. 19 is somewhat similar to FIG. 18, except that the three bars 2265 with attached fins are arranged horizontally and each has one end rotatably secured to a lower horizontal bar attached to two vertical posts 226 and the other end rotatably secured to an upper horizontal bar to 266. Rotation of the bars 2265 is controlled by spring 2267 which is secured to the upper horizontal bar and the swimmer body.

Figure 20:
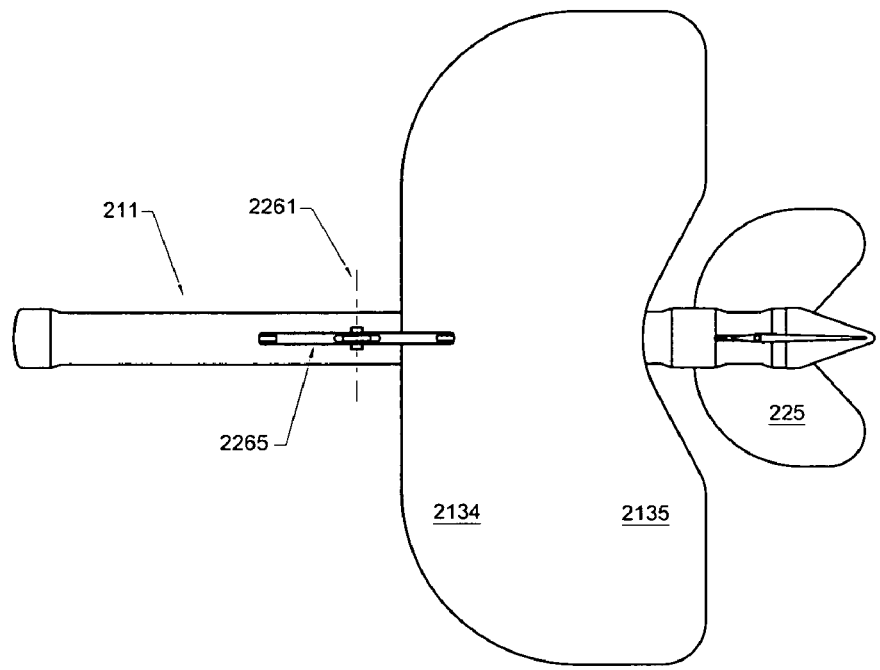
FIG. 20 is a plan view of the water vehicle of FIG. 21,
FIGS. 22A to 22C show different configurations of a water vehicle having a flexible body.
Figure 21:
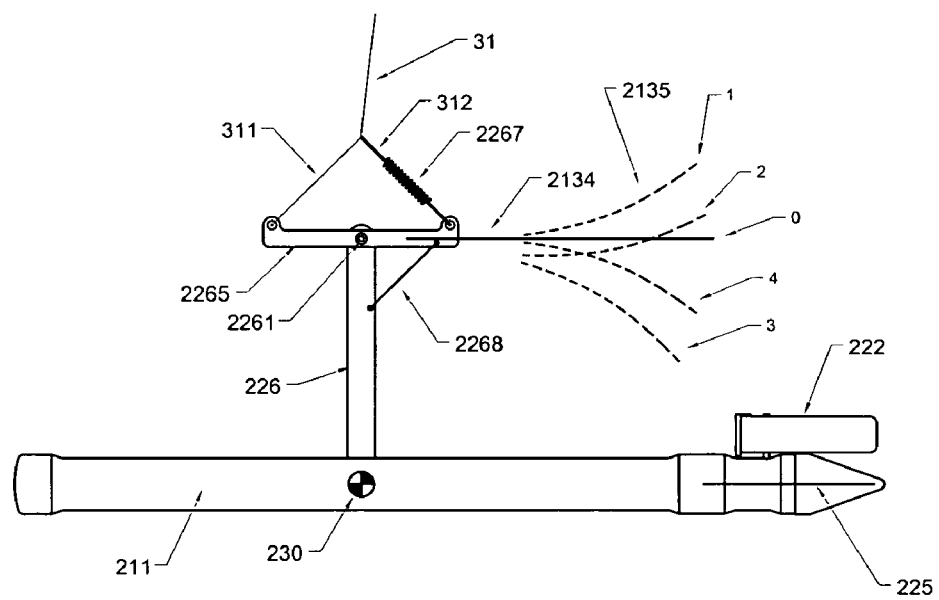

In FIGS. 20 and 21, there is a single post having a bar 2265 rotatably secured to its top. The leading edge of the fin is secured to one end of the bar 2265. The lower legs 311 and 312 of tether 31 are secured to the ends of the bar 2265, and leg 312 includes spring 2267. Rotation of the bar 2265 is limited by flexible line 2268. Fixed horizontal stabilizer fin 225 is secured to the trailing end of the swimmer body.

Figure 22A:
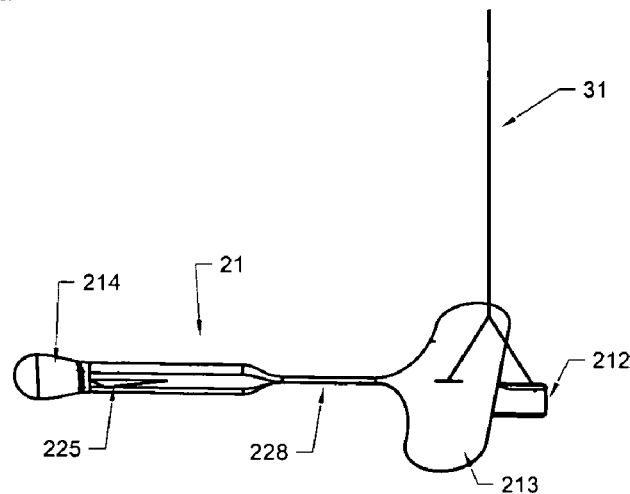
Figure 22B:
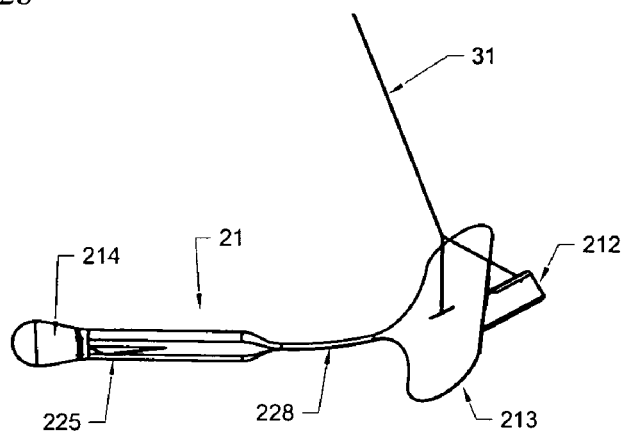
Figure 22C:
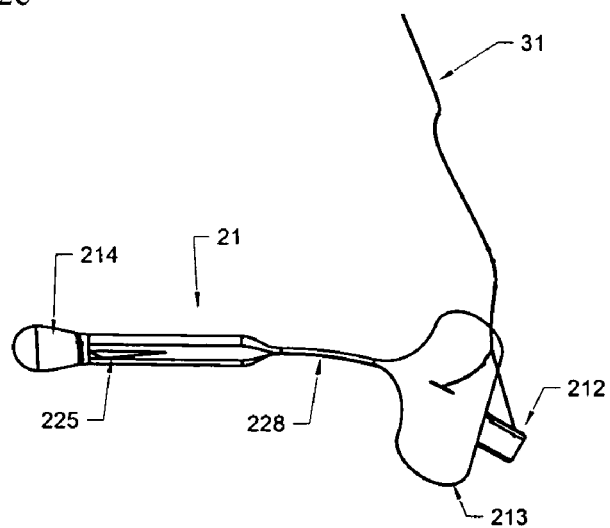

FIGS. 22A-22C show the different configurations of a swimmer comprising a swimmer body 21 having a rigid rear section 214 having horizontal fixed stabilizer 225 secured thereto; a central section 228 which can be deformed elastically in the vertical plane but not substantially deformed in the horizontal plane; and a rigid front section 212 to which a rigid fin 213 is secured. A tether 31 is secured to front section 212. In FIG. 22A, the swimmer is in still water. In FIG. 22B, the swimmer is being pulled upwards. In FIG. 22C, the tether tension has dropped, and the weight of the swimmer is forward of the center of lift, causing the front section to tilt downwards.

Figure 23:
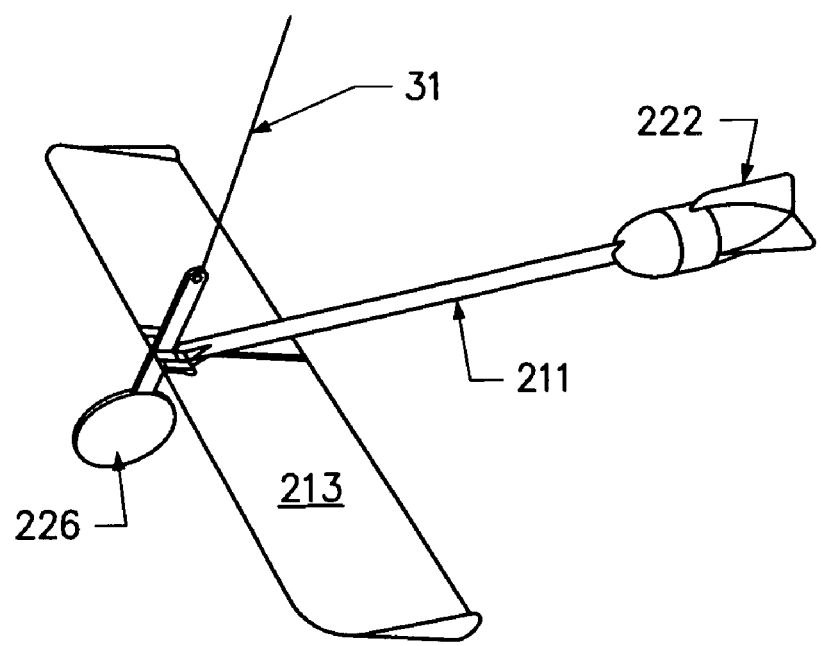
FIGS. 23-25 are perspective views of water vehicles.

FIG. 23 shows a swimmer which operates in a way similar to the swimmer shown in FIG. 22. The rigid fin 213 rotates relative to rigid swimmer body 211, and the tether is attached to the top of a post 226 which rotates relative to the fin and the swimmer body, and which carries a stabilizing weight 226 at its bottom end.

Figure 24:
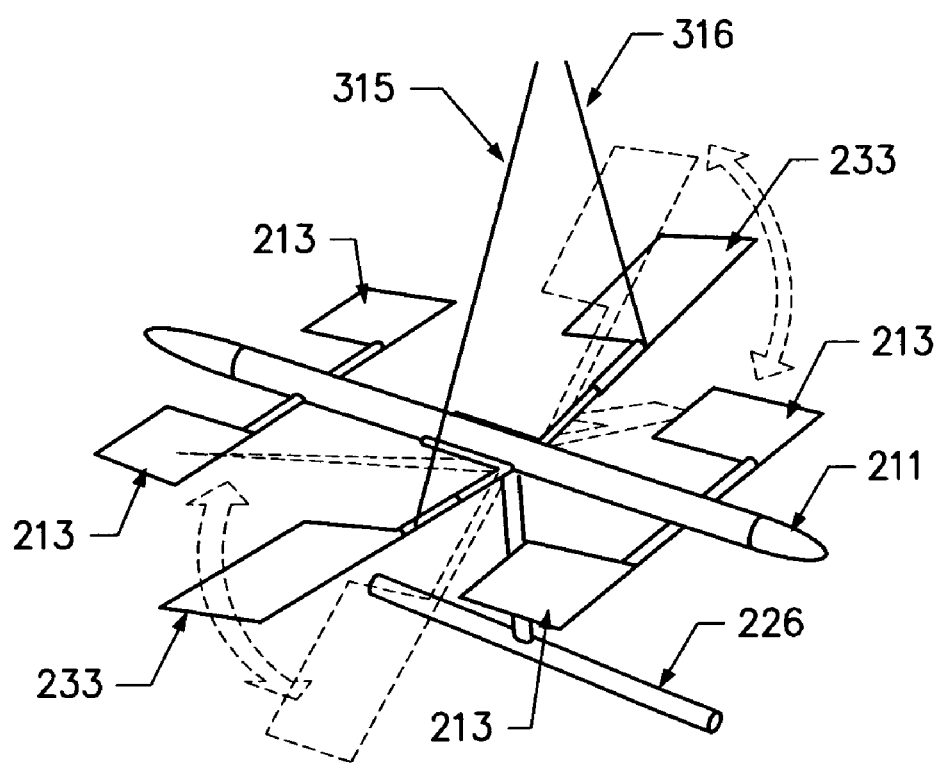
Figure 25:
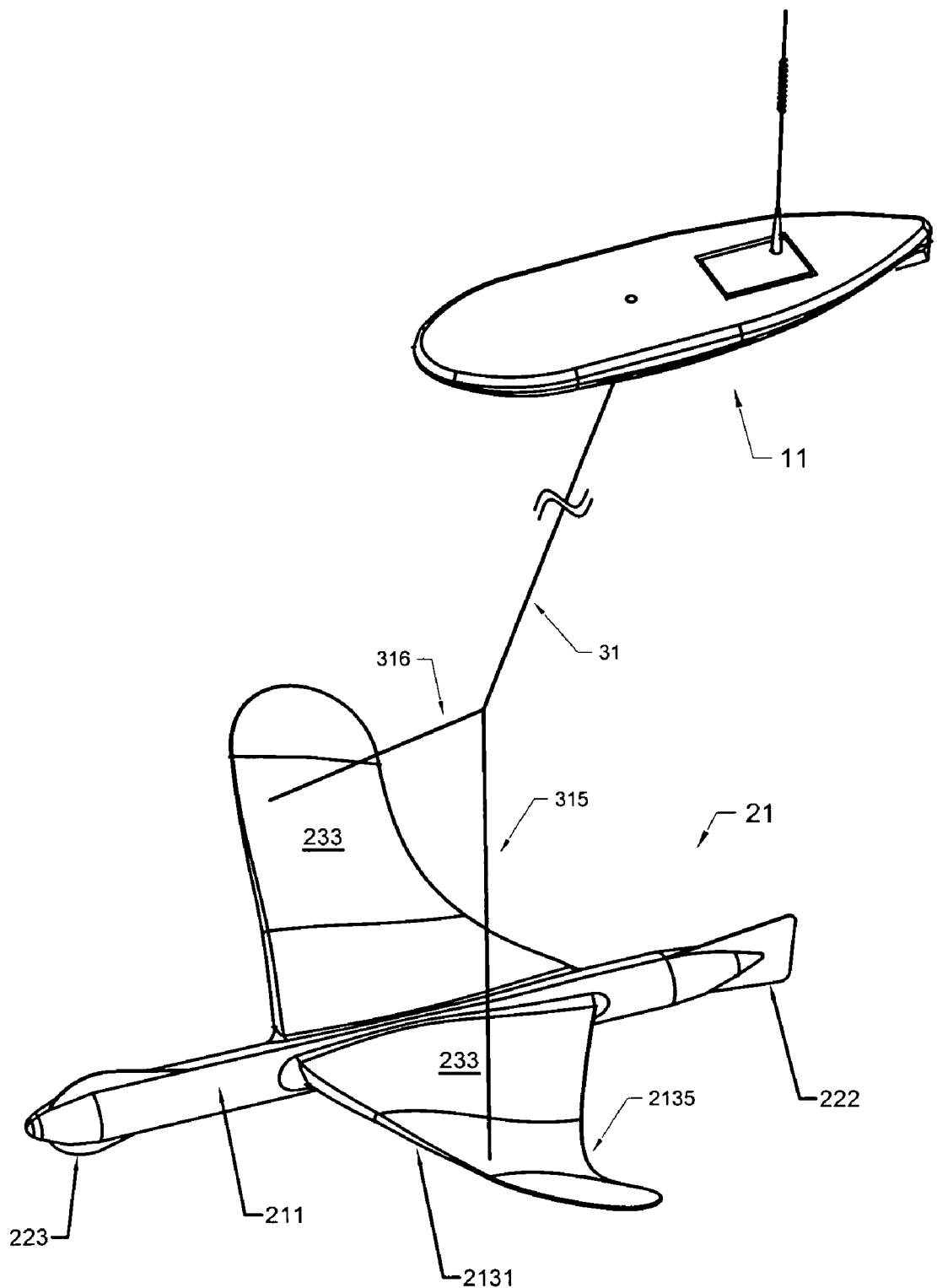

FIGS. 24 and 25 show swimmers in which the fin system comprises two fins 233 which rotates about an aligned axis and are connected, at points outboard of the swimmer body, to transverse bottom legs 315 and 316 of tether 31. The swimmer shown in FIG. 24 also comprises rigid fixed vertical fins 223 at the leading end of the swimmer body.

What is claimed is:

1. A wave-powered water vehicle which comprises
   (1) a float,
   (2) a swimmer,
   (3) a first tether which connects the float and the swimmer, and which is attached to a fore position on the float and to a fore position on the swimmer; and
   (4) a second tether which connects the float and the swimmer, and which is attached to an aft position on the float and to an aft position on the swimmer;
   the float, swimmer and tether being such that, when the vehicle is in still water,
   (i) the float is on or near the surface of the water,
   (ii) the swimmer is submerged below the float, and
   (iii) the tether is under tension;
   the swimmer, when the vehicle is in wave-bearing water, interacting with the water to generate forces which tend to move the float horizontally; and
   each of the tethers comprising
   (A) an elongate tensile member which carries load when the tether is under tension and which passes through a leading edge portion of the tether, and
   (B) a jacket which provides the outer surface of the tether.

2. A wave-powered water vehicle according to claim 1 which further comprises
   (5) a device to detect twisting of the tethers.

3. A wave-powered water vehicle according to claim 1 which further comprises
   (6) a device to correct twisting of the tethers.

4. A wave-powered water vehicle according to claim 1 which further comprises
   (7) equipment which can change the length of the tethers.

5. A wave-powered water vehicle according to claim 1 wherein at least one of the tethers further comprises
   (C) at least one additional elongate member which (i) does not carry load when the tether is under tension, and (ii) transmits one or both of data and electrical power, and
   (D) a second elongate tensile member which carries load when the tether is under tension and which passes through a trailing edge portion of the tether.

6. A wave-powered water vehicle according to claim 5 wherein the additional elongate member comprises one or more members selected from insulated electrical conductors, optical fibers and acoustic cables.

7. A wave-powered water vehicle according to claim 1 wherein each of the tethers has a cross-section having
   (i) a length of 0.5 to 1.0 inch, and
   (ii) a transverse dimension of 0.125 to 0.5 inch.

8. A wave-powered water vehicle according to claim 1 wherein the tensile member in at least one of the tethers is composed of a metal.

9. A wave-powered water vehicle according to claim 1 wherein the tensile member in at least one of the tethers is composed of a polymeric composition.

10. A wave-powered water vehicle according to claim 1 wherein the jacket in at least one of the tethers comprises a polymeric composition and has a streamlined cross-section.

11. A wave-powered water vehicle which comprises
    (1) a float,
    (2) a swimmer,
    (3) a tether connecting the float and the swimmer, and
    (4) at least one device selected from the group consisting of devices to detect twisting of the tether and devices to correct twisting of the tether; and
    the float, swimmer and tether being such that, when the vehicle is in still water,
    (i) the float is on or near the surface of the water,
    (ii) the swimmer is submerged below the float, and
    (iii) the tether is under tension;
    the swimmer, when the vehicle is in wave-bearing water, interacting with the water to generate forces which tend to move the float horizontally; and
    the tether comprising
    (A) an elongate tensile member which carries load when the tether is under tension and which passes through a leading edge portion of the tether,
    (B) at least one additional elongate member which (i) does not carry load when the cable is under tension, (ii) transmits one or both of data and electrical power, and (iii) comprises one or more members selected from the group consisting of insulated electrical conductors, optical fibers and acoustic cables, and
    (C) a jacket which comprises a polymeric composition and which provides the outer surface of the tether.

12. A wave-powered water vehicle according to claim 11 wherein the tether further comprises
    (D) a second elongate tensile member which carries load when the tether is under tension and which passes through a trailing edge portion of the tether.

13. A wave-powered water vehicle according to claim 11 wherein the tether has a cross-section having
    (i) a length of 0.5 to 1.0 inch, and
    (ii) a transverse dimension of 0.125 to 0.5 inch.

* * * * *